US007846102B2

(12) United States Patent
Kupnik et al.

(10) Patent No.: US 7,846,102 B2
(45) Date of Patent: Dec. 7, 2010

(54) DIRECT WAFER BONDED 2-D CUMT ARRAY

(75) Inventors: Mario Kupnik, Mountain View, CA (US); Butrus T. Khuri-Yakub, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 194 days.

(21) Appl. No.: 12/288,575

(22) Filed: Oct. 20, 2008

(65) Prior Publication Data
US 2009/0122651 A1 May 14, 2009

Related U.S. Application Data

(60) Provisional application No. 60/999,641, filed on Oct. 18, 2007.

(51) Int. Cl.
A61B 8/14 (2006.01)
H02N 1/00 (2006.01)
(52) U.S. Cl. ......................... 600/459; 310/309; 310/300; 257/E21.002; 257/E21.597
(58) Field of Classification Search ................. 367/181, 367/53, 55; 310/300, 309, 311, 322; 29/594, 29/25.42; 600/437, 427, 407, 443, 459; 257/414, 257/416, 204, 252, 698, 347, E21.002, E21.597
See application file for complete search history.

(56) References Cited

U.S. PATENT DOCUMENTS 6,836,020 B2 * 12/2004 Cheng et al. ............... 257/774

7,612,635 B2 * 11/2009 Huang ........................ 333/186
2004/0085858 A1 * 5/2004 Khuri-Yakub et al. ....... 367/181
2007/0013269 A1 * 1/2007 Huang ........................ 310/334
2007/0215964 A1 * 9/2007 Khuri-Yakub et al. ....... 257/414
2007/0228878 A1 * 10/2007 Huang ........................ 310/322
2008/0197751 A1 * 8/2008 Huang ........................ 310/311

OTHER PUBLICATIONS

U. G''osele et al., "Semiconductor Wafer Bonding", 19998, Annu. Rev. Mater. Sci. 1998. 28: pp. 215-241.*

* cited by examiner

Primary Examiner—Thomas L Dickey
Assistant Examiner—Nikolay Yushin
(74) Attorney, Agent, or Firm—Lumen Patent Firm

(57) ABSTRACT

A capacitive micromachined ultrasonic transducer (CMUT) array connected to a separate electronic unit is provided. The CMUT array includes at least two active elements, a ground element at the array end, and a non-active element having isolation trenches disposed between the active and ground elements. The active element includes a doped first silicon layer, a doped second silicon layer, and a first insulating layer disposed there between. A cavity is in the first silicon layer having a cross section that includes vertical portions disposed at each end of a horizontal portion, and the vertical portion spans from the first insulating layer through the first silicon layer such that a portion of the first silicon layer is isolated by the first insulating layer and the cavity. A membrane layer on the first silicon layer spans the cavity. A bottom electrode is disposed on the bottom of the second silicon layer.

70 Claims, 31 Drawing Sheets

DIRECT WAFER BONDED 2-D CUMT ARRAY

CROSS-REFERENCE TO RELATED APPLICATIONS

This application is cross-referenced to and claims the benefit from U.S. Provisional Patent Application 60/999,641 filed Oct. 18, 2007, which is hereby incorporated by reference.

FIELD OF THE INVENTION

The invention relates generally to electrostatic transducers. More particularly, the invention relates to electrostatic transducer arrays and their fabrication.

BACKGROUND

Capacitive micromachined ultrasonic transducers (CMUT) have gained much attention as an ultrasound transducer technology to complement/replace piezoelectric transducers. CMUTs have been shown to enhance existing medical ultrasound imaging probes, and new applications inappropriate for piezoelectrics have been explored using CMUTs. In medical imaging, examples include annular ring-shaped arrays, micro-linear arrays, fully populated 2D arrays, flexible arrays, and 2D reconfigurable arrays. In medical therapy, CMUTs can provide MR-compatible high-intensity focused ultrasound (HIFU). New designs and fabrication methods have been proposed to improve the performance and reliability of CMUTs such as direct wafer-to-wafer fusion bonding. Waferbonding offers unparalleled fabrication flexibility as well as improved device performance and uniformity, when compared to the traditional surface micromachining technique. Coupled with innovative designs, wafer-bonded CMUTs have delivered high output pressures, while retaining the expected wide fractional bandwidth. To further realize the potential of the wafer-bonded CMUTs for medical imaging applications, it is highly desired to incorporate through-wafer electrical interconnects with wafer-bonded devices so that the CMUT arrays can be directly integrated with a front-end IC by flip-chip bonding.

Through-wafer interconnects are a compact means of providing electrical connections to CMUT elements. These interconnects are necessary in situations where direct wire bonding to array elements is not feasible such as in fully populated 2D arrays; or due to space constraints, e.g., CMUTs for catheter-based applications. Researchers have reported on interconnect techniques both based on through-wafer vias and through-wafer trench isolation. In the through-wafer via implementation, a conductive material, usually doped polysilicon, is used to fill the vias through the several hundred micron thick silicon substrate. This material serves as the conductor between the front side of a silicon wafer, where the CMUT elements reside, and the backside of the wafer, where the flip-chip bond pads are located.

Integrating through-wafer vias with CMUTs is a complex process requiring many lithographic steps. After the deposition of the polysilicon, performing wafer-to-wafer fusion bonding is difficult. The complex through-wafer interconnect fabrication steps degrade wafer surface smoothness; therefore, an expensive chemical-mechanical polishing step is required to get bondable surface quality in terms of roughness. Furthermore, these steps add stress to the wafer, which results in a reduced radius of curvature. To date, no successful through-wafer via fabrication technique has been demonstrated that is compatible with the wafer-bonding technique of making CMUTs. On the other hand, the fabrication process for CMUTs with frameless trench isolation is significantly simpler than through-wafer via process. In that implementation, a carrier wafer is required during the deep reactive ion etching (DRIE) and the flip-chip bonding steps to provide mechanical support for the membranes. This particular requirement presents drawbacks in the fabrication process. Good adhesion between the carrier wafer and the membrane surface is required for adequate mechanical support for the membranes. However, it is then a challenge to separate the carrier wafer and the membrane after the flip-chip bonding. The adhesive material can swell in the solvent and, therefore, create stress that can break the CMUT membranes.

Current fabrication methods include using a carrier wafer during the fabrication process, which generally includes a large number of fabrication steps. Further, the CMUT cell is unprotected during the fabrication process, resulting in contamination of the cell cavity. The resultant CMUT cells have limited design flexibility and suffer from reliability degradation due to electrical breakdown.

Accordingly, there is a need to develop a CMUT structure and fabrication method that reduces the number of fabrications steps, improves CMUT cell structure by increasing electrical breakdown voltage and reducing parasitic capacitance, provides better design flexibility and high controllability for the whole frequency range in which CMUT cells can be used (1 kHz-300 MHz), and further provides a built-in support structure that eliminates the need of a carrier wafer during the fabrication process. What is further needed is a CMUT cell that is completely protected mechanically and protected against contaminations by the membrane silicon-on-insulator (SOI) wafer in an early stage of the fabrication.

SUMMARY OF THE INVENTION

To address the shortcomings in the art, a capacitive micromachined ultrasonic transducer (CMUT) array is provided. The CMUT array includes a silicon on insulator (SOI) substrate having a doped first silicon layer and a first insulating layer with a first insulating layer disposed between the first silicon layer and the second silicon layer. The CMUT array further includes at least two active elements, where each active element is separated by an isolation trench disposed through at least the SOI second silicon layer and surrounds the active element. The first silicon layer provides mechanical support between the active elements. Additionally, at least one cell is disposed in the active element, where the cell has a cavity in the first silicon layer. A cross section of the cavity includes a horizontal cavity portion on top of vertical cavity portions disposed at each end of the horizontal cavity portion, where the vertical cavity portion spans from the first insulating layer through the first silicon layer, and a portion of the first silicon layer is isolated by the first insulating layer and the cavity. The CMUT array further includes a membrane layer disposed on the first silicon layer top surface and spans across at least one cavity, and a bottom electrode disposed on a bottom surface of the second silicon layer. At least one ground contact element is provided, where the ground contact element is isolated from the active elements by at least one trench surrounding the ground contact element. The ground contact element includes a ground electrode disposed on a bottom surface of the doped second silicon layer, at least one ground conductive via disposed from the ground electrode to the SOI first silicon layer, and a conductive top layer that electrically conducts with the membrane layer. The conductive top layer electrically conducts with the ground conductive via through the SOI first silicon layer, wherein the ground conductive via electrically conducts with the ground electrode, and the ground electrodes conduct with the membrane layer. Further included is a separate electronic unit, where the bottom electrodes and the ground electrode are conductively connected to the electronic unit. The ground contact elements are disposed at an end of the array.

According to one aspect of the invention, the separate electronic unit can be a printed circuit board, an integrated circuit, a wafer, a flexible printed circuit board, connection pins or bonding wires. Here, the conductive connection to the integrated circuit includes connecting to different channels of the integrated circuit.

In another aspect, the conductive connection can be solder bump bonding, wafer bonding, soldering, integrated circuit die bonding, wire bonding, connection pins, spring force loaded connection pins, or conductive gluing techniques.

In a further aspect, a non-active element is disposed between the active element and the ground contact element, where the non-active element has at least an isolated second SOI layer, where the isolated second SOI layer is isolated by the buried oxide layer and at least one isolation trench.

In one aspect of the invention, the active element bottom electrodes are DC biased.

According to another aspect, the first insulating layer is an oxide layer.

In another aspect of the invention, the CMUT array further includes a top electrode, disposed on a top surface of the membrane layer, where the membrane layer is a nonconductive layer or a conductive layer that can include undoped silicon, silicon nitride, undoped silicon carbide, nonconductive diamond, doped silicon, doped silicon carbide, or conductive diamond.

In one aspect, the membrane layer is made from a conductive material such as doped silicon, doped silicon from a second SOI substrate, silicon nitride, doped silicon carbide, doped polycrystalline silicon, undoped polycrystalline and conductive diamond, wherein the membrane layer is also or electrode.

In one embodiment, the CMUT array further includes a second insulating layer disposed on a top surface of the first silicon layer, on the walls of the vertical cavity portion and on a top surface of the isolated silicon layer portion of the first silicon layer, where the isolated silicon layer portion is enveloped by the first insulating layer and the second insulating layer. Here, the second insulating layer is an insulating oxide layer, wherein the insulating oxide layer has a thickness in a range from 10 nm to 30 µm.

According to another aspect of the invention, the cavity has a vacuum or a gas, where the gas can be air, noble gas, nitrogen, oxygen, hydrogen or carbon dioxide.

In a further embodiment of the current invention, the cell further includes at least one conductive via disposed through the second silicon layer and into the isolated silicon layer, where the conductive via is in contact with the bottom electrode layer. Here, the first silicon layer of the SOI substrate is undoped, where the isolated silicon layer is doped, and the via is a conduit for doping the isolated silicon layer. The conducting via has a hole diameter in a range of 1 µm to 100 µm.

In another aspect of the invention, the first silicon layer has a thickness in a range from 1 µm to 1,000 µm.

In a further aspect, the second silicon layer has a thickness in a range from 1 µm to 1,000 µm.

In one aspect, the membrane layer has a thickness in a range from 0.1 µm to 500 µm.

In another aspect, the buried oxide layer has a thickness in a range from 0.01 µm to 60 µm.

In one aspect of the invention, the horizontal cavity portion has a thickness in a range from 10 nm to 500 µm.

In a further aspect, the isolated silicon layer has a thickness in a range from 1 µm to 1,000 µm.

According to another aspect, the first insulating layer disposed on the top surface of the second silicon layer is thicker than a second insulating layer disposed on the vertical cavity portion and on the top surface of the isolated silicon layer portion. Here, the second insulating layer disposed on the vertical cavity portion and the top surface of the isolated silicon layer portion has a thickness in a range of 1 nm to 10 µm.

In one aspect of the invention, the trenches are filled with an electrically insulating material that can include air, epoxy, low temperature oxide, silicon nitride, polymer, PDMS, parylene, spin on glass, polyimide, TEOS, rubber, PMMA, and gel.

According to one embodiment the invention includes a method of fabricating a CMUT array. The current method includes providing a first silicon on insulator (SOI) substrate having a doped first silicon layer and a first insulating layer, providing a doped second silicon layer, where the first insulating layer is disposed between the first silicon layer and the second silicon layer. The method include forming at least two active elements, where the active element is separated by an isolation trench surrounding the active element, and the trench is disposed through at least the SOI second silicon layer, where the first silicon layer provides mechanical support between the active elements. The method further includes forming at least one cell in the active element by forming at least one horizontal cavity portion in the first silicon layer, forming a vertical cavity portion at each end of the at least one horizontal cavity portion, where the vertical cavity portion spans from the first insulating layer through the first silicon layer, depositing a second insulating layer on the on a top surface of the first silicon layer, on the walls of the vertical cavity portion and on a top surface of the isolated silicon layer portion of the first silicon layer, where the isolated silicon layer portion is enveloped by the first insulating layer and the second insulating oxide layer. The method includes bonding a silicon substrate to the second insulating layer of the top surface of the first silicon layer, where a bottom region of the silicon substrate is a conductive membrane layer, and removing a top region of the silicon substrate, where the silicon substrate bottom region forms the membrane layer across at least one the cavity, forming at least one ground contact element, where the ground contact element is isolated from the active elements by at least one trench surrounding the ground contact element. The ground contact element includes a ground electrode disposed on a bottom surface of the doped second silicon layer. at least one ground conductive via disposed from the ground electrode to the SOI first silicon layer, and a conductive top layer that electrically conducts with the membrane layer, where the conductive top layer electrically conducts with the ground conductive via through the SOI first silicon layer, and the ground conductive via electrically conducts with the ground electrode, and the ground electrodes conduct with the membrane layer. The method further includes providing a separate electronic unit, where the bottom electrodes and the ground electrodes are conductively connected to the electronic unit, where the ground contact elements are disposed at an end of the array.

According to one aspect of the current embodiment, the method further includes depositing a top electrode on a top surface of the membrane layer, where the membrane layer is a nonconductive layer or a conductive layer such as undoped silicon, silicon nitride, undoped silicon carbide, nonconductive diamond, doped silicon, doped silicon from a second the SOI substrate, silicon nitride, doped silicon carbide, or conductive diamond.

In another aspect of the current embodiment the membrane layer is made from a conductive material such as doped silicon, doped silicon from a second the SOI substrate, doped silicon carbide, and conductive diamond, wherein the membrane layer is also an electrode.

In another aspect of the current embodiment, before removing the top region of the silicon substrate, the method further includes providing at least one contact hole disposed through the second silicon layer and into the isolated silicon layer and depositing a conductive layer in the contact hole, where the conductive layer in the contact hole provides a conductive via to the isolated silicon layer from the bottom electrode layer.

In a further aspect of the current embodiment, the first SOI substrate has an undoped first silicon layer, where the isolated silicon layer is undoped, and before removing the top region of the silicon substrate, the method further includes providing at least one contact hole disposed through the second silicon layer and into the isolated silicon layer, doping the undoped isolated silicon layer through the contact hole, and depositing a conductive layer in the contact hole, wherein the conductive layer in the contact hole provides a conductive via to the isolated silicon layer from the bottom electrode layer.

In another aspect of the current embodiment the insulating layer disposed on the vertical cavity portion and the top surface of the isolated silicon layer portion has a thickness in a range of 1 nm to 10 µm.

In another aspect of the current embodiment the bonding of the silicon substrate to the insulating layer is done in a vacuum or in a gas, where the cavity includes the vacuum or the gas, and the gas can be air, noble gas, nitrogen, oxygen, hydrogen or carbon dioxide.

In further aspect of the current embodiment the conductive bottom region of the silicon substrate is made from conductive material such as silicon, doped silicon carbide, or conductive diamond.

In another aspect of the current embodiment the separate electronic unit can be a printed circuit board, an integrated circuit, a wafer, a flexible printed circuit board, connection pins or bonding wires. Here, the conductive connection to the integrated circuit includes connecting to different channels of the integrated circuit.

In another aspect of the current embodiment the conductive connection can be solder bump bonding, wafer bonding, soldering, integrated circuit die bonding, wire bonding, connection pins, spring force loaded connection pins, or conductive gluing techniques.

In yet another aspect of the current embodiment a nonactive element is disposed between the active element and the ground contact element, where the non-active element includes at least an isolated second SOI layer that is isolated by the buried oxide layer and at least one the isolation trench.

In a further aspect of the current embodiment the active element bottom electrodes are DC biased.

In still another aspect of the current embodiment the trenches are filled with an electrically insulating material such as air, epoxy, low temperature oxide, silicon nitride, polymer, PDMS, parylene, spin on glass, polyimide, TEOS, rubber, PMMA, or gel.

According to another embodiment of the current invention, method of fabricating a capacitive micromachined ultrasonic transducer (CMUT) array includes providing a first silicon on insulator (SOI) substrate having a doped first silicon layer and a first insulating layer, providing a doped second silicon layer disposed between the first silicon layer and the second silicon layer, forming at least two active elements, where the active element is separated by an isolation trench surrounding the active element, and the trench is disposed through at least the SOI second silicon layer, where the first silicon layer provides mechanical support between the active elements. The current method further includes forming at least one cell in the active element by forming at least one horizontal cavity portion in the first silicon layer, forming a vertical cavity portion at each end of the at least one horizontal cavity portion, where the vertical cavity portion spans from the first insulating layer through the first silicon layer, depositing a second insulating layer on the on a top surface of the first silicon layer, on the walls of the vertical cavity portion and on a top surface of the isolated silicon layer portion of the first silicon layer, wherein the isolated silicon layer portion is enveloped by the first insulating layer and the second insulating oxide layer, bonding a silicon substrate to the second insulating layer of the top surface of the first silicon layer, where a bottom region of the silicon substrate is a conductive membrane layer, and removing a top region of the silicon substrate, where the silicon substrate bottom region forms the membrane layer across at least one the cavity. The method further includes forming at least one ground contact element that is isolated from the active elements by at least one the trench surrounding the ground contact element. The ground contact element includes a ground electrode disposed on a bottom surface of the doped second silicon layer, at least one ground conductive via disposed from the ground electrode to the SOI first silicon layer, and a conductive top layer that electrically conducts with the membrane layer, where the conductive top layer electrically conducts with ground conductive via through the SOI first silicon layer, and the ground conductive via electrically conducts with the ground electrode, wherein the ground electrodes conduct with the membrane layer. The current method further includes providing a separate electronic unit, wherein the bottom electrodes and the ground electrodes are conductively connected to the electronic unit, wherein the ground contact elements are disposed at an end of the array.

In one aspect of the current embodiment the method further includes depositing a top electrode on a top surface of the membrane layer, where the membrane layer is a nonconductive layer or a conductive layer such as undoped silicon, silicon nitride, undoped silicon carbide, nonconductive diamond, doped silicon, doped silicon from a second the SOI substrate, silicon nitride, doped silicon carbide, or conductive diamond.

In another aspect of the current embodiment the membrane layer is made from a conductive material such as doped silicon, doped silicon from a second the SOI substrate, doped silicon carbide, or conductive diamond, where the membrane layer is also an electrode.

In another aspect of the current embodiment, before removing the top region of the silicon substrate, the method further includes providing at least one contact hole disposed through the second silicon layer and into the isolated silicon layer, and depositing a conductive layer in the contact hole, where the conductive layer in the contact hole provides a conductive via to the isolated silicon layer from the bottom electrode layer.

In one aspect of the current embodiment the first SOI substrate includes an undoped first silicon layer, and the isolated silicon layer is undoped, where before removing the silicon substrate top layer, the method further includes providing at least one contact hole disposed through the second silicon layer and into the isolated silicon layer, doping the undoped isolated silicon layer through the contact hole, and depositing a conductive layer in the contact hole, where the conductive layer in the contact hole provides a conductive via to the isolated silicon layer from the bottom electrode layer.

In another aspect of the current embodiment the bonding of the silicon substrate to the top surface of the first silicon layer is done in a vacuum or in a gas wherein the cavity such as a vacuum or gas, wherein the gas can be air, noble gas, nitrogen, oxygen, hydrogen, or helium.

In another aspect of the current embodiment the separate electronic can be a printed circuit board, an integrated circuit, a wafer, a flexible printed circuit board, connection pins or bonding wires. Here, the conductive connection to the integrated circuit includes connecting to different channels of the integrated circuit.

In another aspect of the current embodiment the conductive connection can be solder bump bonding, wafer bonding, soldering, integrated circuit die bonding, wire bonding, connection pins, spring force loaded connection pins, or conductive gluing techniques.

In another aspect of the current embodiment a non-active element is disposed between the active element and the ground contact element, where the non-active element includes at least an isolated second SOI layer, where the isolated second SOI layer is isolated by the buried oxide layer and at least one isolation trench.

In a further aspect of the current embodiment the active element bottom electrodes are DC biased.

In another aspect of the current embodiment, the trenches are filled with an electrically insulating material such as air, epoxy, low temperature oxide, silicon nitride, polymer, PDMS, parylene, spin on glass, polyimide, TEOS, rubber, PMMA, or gel.

According to another embodiment, the CMUT array of the current invention includes a doped first silicon layer and a first insulating layer disposed on the first insulating layer, at least two active elements, and at least one cell disposed in the active element. The cell includes a cavity in the first silicon layer, where a cross section of the cavity includes a horizontal cavity portion on top of vertical cavity portions disposed at each end of the horizontal cavity portion, where the vertical cavity portion spans from the first insulating layer through the first silicon layer, where a portion of the first silicon layer is isolated by the first insulating layer and the cavity. The CMUT array further includes a membrane layer disposed on the first silicon layer top surface and spans across at least one cavity, and a bottom electrode disposed on a bottom surface of the second silicon layer. The CMUT array has at least one ground contact element that is isolated from the active elements by a trench disposed through at least the SOI second silicon layer. The ground contact element includes a ground electrode disposed on a bottom surface of the doped second silicon layer, at least one ground conductive via disposed from the ground electrode to the SOI first silicon layer, and a conductive top layer that electrically conducts with the membrane layer, where the conductive top layer electrically conducts with ground conductive via through the SOI first silicon layer, and the ground conductive via electrically conducts with the ground electrode, where the ground electrodes conduct with the membrane layer. The CMUT array further includes a separate electronic unit, where the bottom electrodes and the ground electrode are conductively connected to the electronic unit, and the ground contact elements are disposed at an end of the array.

In one aspect of the current embodiment the CMUT further includes at least one isolation trench, where each the active element is separated by the isolation trench and the isolation trench is disposed through at least the first insulating layer and surrounds the active element, where the first silicon layer provides mechanical support between the active elements.

In a further aspect of the current embodiment the trenches are filled with an electrically insulating material such as air, epoxy, low temperature oxide, silicon nitride, polymer, PDMS, parylene, spin on glass, polyimide, TEOS, rubber, PMMA, and gel.

In another aspect of the current embodiment the first insulating layer can be oxide, quartz, glass, pyrex, soda lime, borosilicate, borofloat glass, fused quartz, fused silica, or sapphire.

In a further aspect of the current embodiment the CMUT array further includes a top electrode disposed on a top surface of the membrane layer, where the membrane layer is a nonconductive layer or a conductive layer such as undoped silicon, silicon nitride, undoped silicon carbide, nonconductive diamond, doped silicon, doped silicon carbide, or conductive diamond.

In a further aspect of the current embodiment the membrane layer is made from a conductive material such as doped silicon, doped silicon from a second the SOI substrate, silicon nitride, doped silicon carbide, doped polycrystalline silicon, undoped polycrystalline or conductive diamond, where the membrane layer is also an electrode.

In yet another aspect of the current embodiment the CMUT array further includes a second insulating layer disposed on a top surface of the first silicon layer, on the walls of the vertical cavity portion and on a top surface of the isolated silicon layer portion of the first silicon layer, where the isolated silicon layer portion is enveloped by the first insulating layer and the second insulating layer.

In a further aspect of the current embodiment the second insulating layer is an insulating oxide layer, wherein the insulating oxide layer.

In another aspect of the current embodiment the second insulating layer has a thickness in a range of 1 nm to 30 µm.

According to another aspect of the current embodiment, the cavity includes a vacuum or a gas, where the gas can be air, noble gas, nitrogen, oxygen, hydrogen and carbon dioxide.

In a further aspect of the current embodiment the CMUT array further includes at least one conductive via disposed through the first insulating layer and into the isolated silicon layer, where the conductive via is in contact with the bottom electrode layer. Here, the conducting via has a hole diameter in a range of 1 µm to 100 µm.

In a further aspect of the current embodiment the first insulating layer has a thickness in a range from 1 µm to 1,000 µm.

In yet another aspect of the current embodiment the first silicon layer has a thickness in a range from 1 µm to 1,000 µm.

In a further aspect of the current embodiment the horizontal cavity portion has a thickness in a range from 10 nm to 500 µm.

According to another aspect of the current embodiment the isolated silicon layer has a thickness in a range from 1 µm to 1,000 µm.

In another aspect, the separate electronic unit can be a printed circuit board, an integrated circuit, a wafer, a flexible printed circuit board, connection pins and bonding wires.

In a further aspect of the current embodiment the conductive connection to the integrated circuit includes connecting to different channels of the integrated circuit.

In another aspect of the current embodiment the conductive connection can include solder bump bonding, wafer bonding, soldering, integrated circuit die bonding, wire bonding, connection pins, spring force loaded connection pins, or conductive gluing techniques.

In a further aspect of the current embodiment the active element bottom electrodes are DC biased.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

The invention includes a device and method for providing fully populated two dimensional (2D) capacitive micromachined ultrasonic transducer arrays, based on direct wafer bonding. The advantages are: (1) a reduced number of fabrications steps; (2) an improved CMUT cell structure (increased electrical breakdown voltage and reduced parasitic capacitance, (3) a better design flexibility and a high controllability for the whole frequency range in which CMUT arrays can be used (1 kHz-300 MHz); (4) a built-in support structure that eliminates the need of a carrier wafer during the fabrication process or a complicated trench-isolation structure with front side contact openings through the membrane; and (5) an inherent advantage that the CMUT cells are completely protected (mechanical protection and protection against contaminations) by the membrane silicon-on-insulator (SOI) wafer in an early stage of the fabrication process until the second last step of the fabrication process, i.e. almost during all fabrication steps.

The current invention is useful to almost every CMUT application where 2D arrays are needed. This includes all types of ultrasound based medical imaging applications and photoacoustic imaging. In these applications the 2D CMUT array can be chip bonded on top of an IC die for electronics integration, for example. Other examples are therapeutic treatment applications, such as high-intensity focussed ultrasound (HIFU) or even non-medical imaging applications, such as ultrasonic flowmeter (UFM,) and non-destructive evaluation (NDE) applications for which beam steering and focussing is advantageous.

Figure 1:
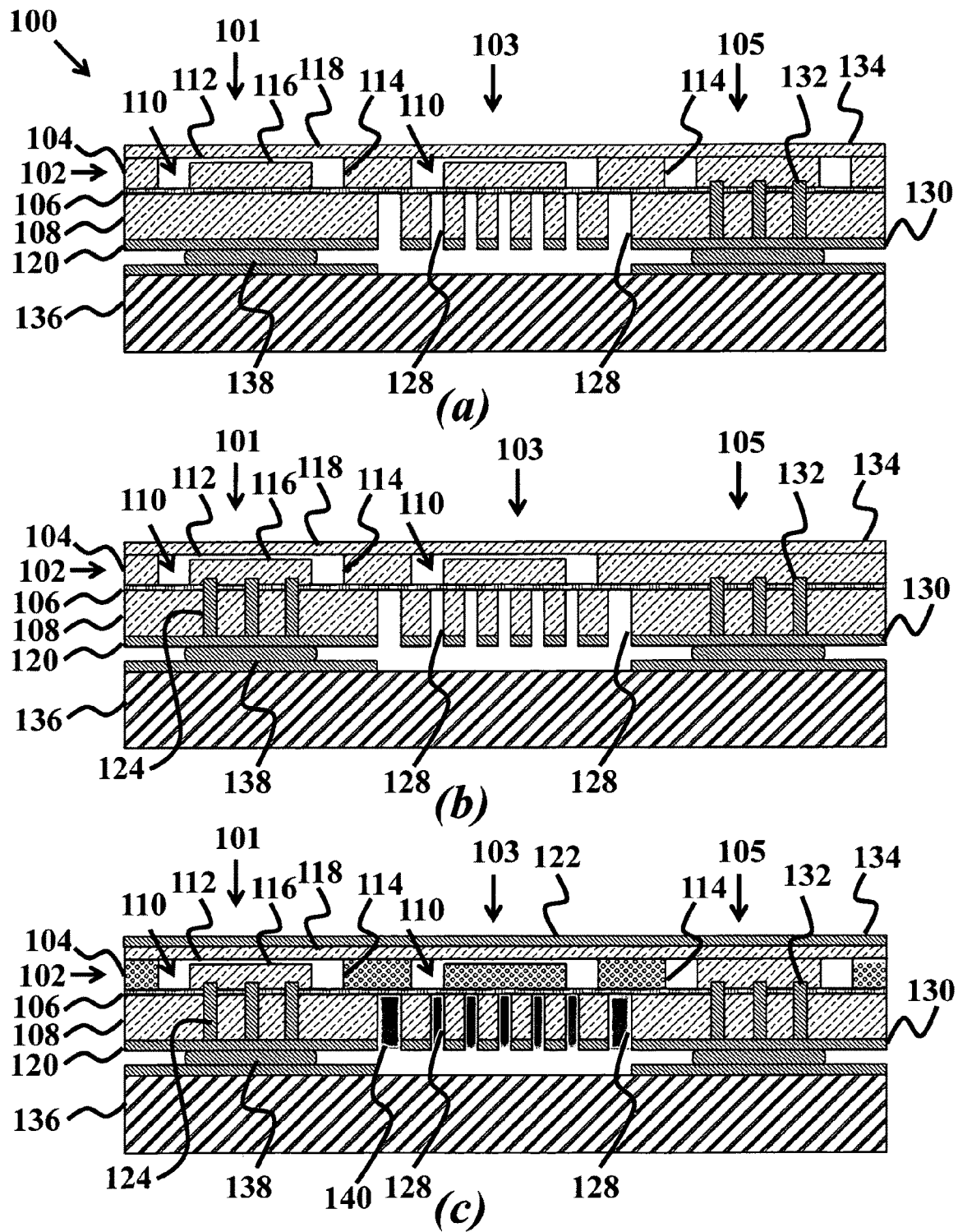
FIGS. 1(a)-1(i) show various embodiments of the CMUT cell and an array structure according to the present invention.
Figure 1:
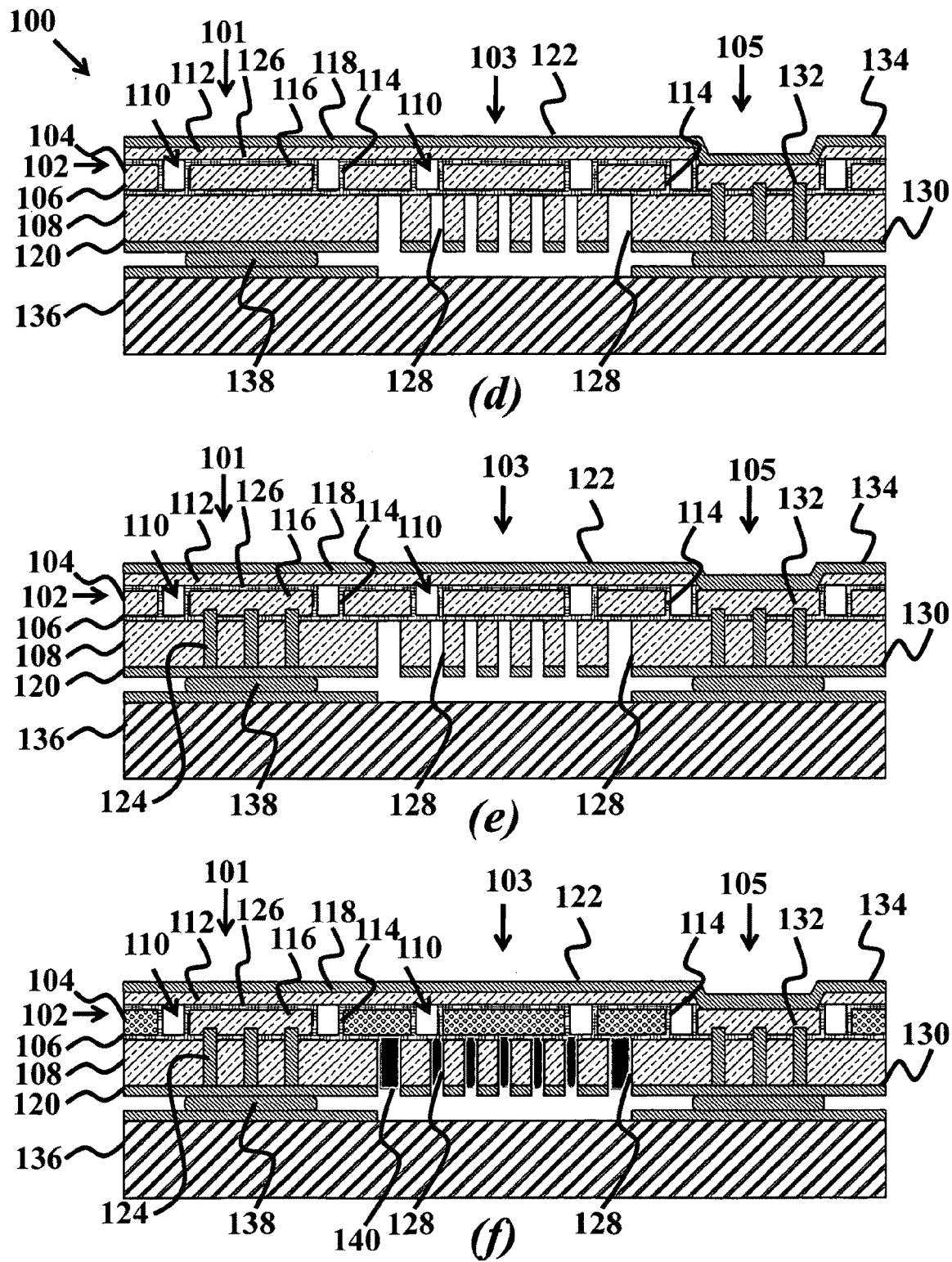
Figure 1:
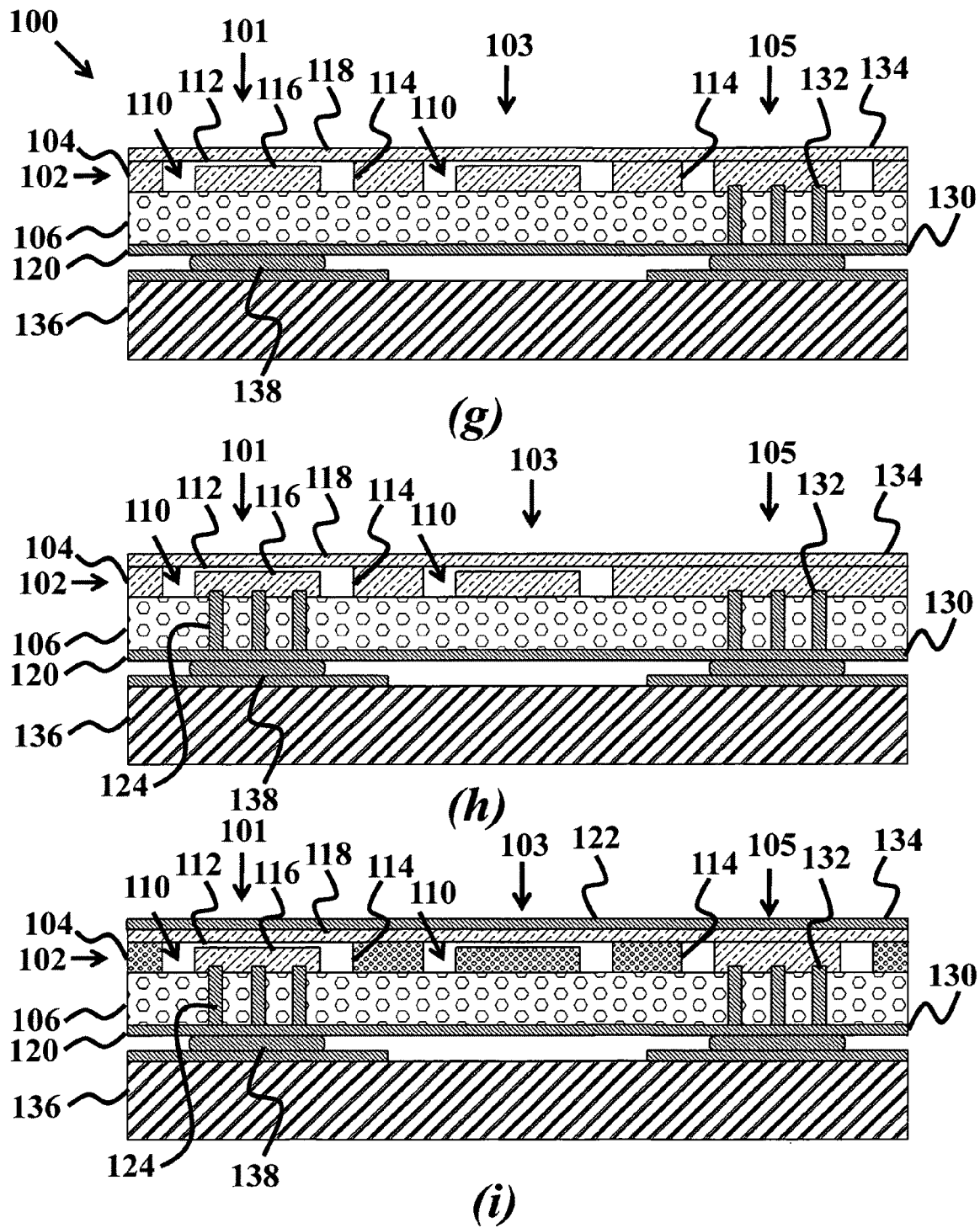

FIGS. 1(a)-1(i) show different embodiments of the CMUT cell and an array structure 100, according to the current invention. FIG. 1(a) shows an active CMUT cell 101 adjacent to a non-active cell 103, which is adjacent to a ground contact element 105, where only one active element 101 is shown for illustrative purposes and it is understood that the array according to the current invention includes at least two active cells 101. The CMUT cell and array structure 100 includes a silicon on insulator (SOI) substrate 102, where the SOI substrate 102 includes a doped first silicon layer 104 and a first insulating layer 106, a doped second silicon layer 108, where the first insulating layer 106, is disposed between the first silicon layer 104 and the second silicon layer 108. The at least two active elements 101 are separated by an isolation trench 128 disposed through at least the SOI second silicon layer 108 and surrounds the active element 101. The first silicon layer 102 provides mechanical support between the active elements 101. Additionally, at least one cell is disposed in the active element 101, where the cell has a cavity 110 in the first silicon layer 104, where a cross section of the cavity 110 includes a horizontal cavity portion 112 on top of vertical cavity portions 114 disposed at each end of the horizontal cavity portion 112, and the vertical cavity portion 114 spans from the first insulating layer 106 through the first silicon layer 104, such that a portion of the first silicon layer is isolated 116 by the first insulating layer 106 and the cavity 110. A membrane layer 118 is disposed on the first silicon layer 104 top surface, and spans across at least one cavity 110, and a bottom electrode 102 is disposed on a bottom surface of the second silicon layer 108. At least one ground contact element 105 is provided, where the ground contact element 105 is isolated from the active elements 101 by at least one trench 128 surrounding the ground contact element 105. The ground contact element 105 includes a ground electrode 130 disposed on a bottom surface of the doped second silicon layer 108, at least one ground conductive via 132 disposed from the ground electrode 130 to the SOI first silicon layer 102, and a conductive top layer 134 that electrically conducts with the membrane layer 118. The conductive top layer 134 electrically conducts with the ground conductive via 132 through the SOI first silicon layer 104, wherein the ground conductive via 132 electrically conducts with the ground electrode 130, and the ground electrodes 130 conduct with the membrane layer 118. Further included is a separate electronic unit 136, where the bottom electrodes 120/130 and the ground electrode 130 are conductively connected 138 to the electronic unit 136. The ground contact elements 105 are disposed at an end of the array 100. The electronic unit 136 is shown without detail and should be understood to provide functionality with the ground 105 and active elements 101.

According to all of different embodiments of the invention, the cavity 110 can include a vacuum or a gas, where the gas can be air, noble gas, nitrogen, oxygen, hydrogen or carbon dioxide, the membrane layer 118 can be made from a conductive material such as doped silicon, doped silicon from a second SOI substrate, silicon nitride, doped silicon carbide, doped polycrystalline silicon, undoped polycrystalline silicon and conductive diamond, where the membrane layer 118 is also an electrode, and the first insulating layer 106 can be an oxide layer.

According to one aspect of the invention, the separate electronic unit 136 can be a printed circuit board, an integrated circuit, a wafer, a flexible printed circuit board, connection pins or bonding wires. Here, the conductive connection 138 to the integrated circuit includes connecting to different channels of the integrated circuit. Further, the conductive connection 138 can be solder bump bonding, wafer bonding, soldering, integrated circuit die bonding, wire bonding, connection pins, spring force loaded connection pins, or conductive gluing techniques.

According one aspect of the current invention, the active element bottom electrodes 120 are DC biased.

Some general aspects of the different embodiments of the current invention include the first silicon layer 104 having a thickness in a range from 1 µm to 1,000 µm, the second silicon layer 108 having a thickness in a range from 1 µm to 1,000 µm, the membrane layer 118 having a thickness in a range from 0.1 µm to 500 µm, the buried oxide layer 104 having a thickness in a range from 0.01 µm to 60 µm, the horizontal cavity 112 portion having a thickness in a range from 10 nm to 500 µm, and the isolated silicon layer 116 having a thickness in a range from 1 µm to 1,000 µm.

As shown in FIG. 1(c) and FIGS. 1(d)-1(f) the CMUT array 100 can further include a top electrode 122, disposed on a top surface of the membrane layer 118 and the conductive top layer 134 of the ground element 105, where the membrane layer 118 is a nonconductive layer or a conductive layer that can include undoped silicon, silicon nitride, undoped silicon carbide, nonconductive diamond, doped silicon, doped silicon carbide, or conductive diamond. It is understood that the embodiment shown in FIG. 1(a)-1(b) and FIG. 1(g)-(i) could also be configured with the top electrode 122 as shown in FIGS. 1(b)-1(i), or conversely, all the embodiments shown can be configured without the top electrode, provided the membrane layer 118 is an electrically conductive layer.

As shown in FIGS. 1(a)-(i), the non-active element 103 is disposed between the active element 101 and the ground contact element 105, where the non-active element 103 has at least the isolated second SOI layer 116 that is isolated by the buried oxide layer 106, a cavity 110 and at least one isolation trench 128.

FIG. 1(b) shows another embodiment of the CMUT cell and an array structure 100 according to the current invention. The array 100 of FIG. 1(b) includes the aspects of the embodiment of FIG. 1(a), and further includes at least one conductive via 124 disposed through the second silicon layer 108 and into the isolated silicon layer 116, where the conductive via 124 is in contact with the bottom electrode layer 120. According to the current invention, the conducting via 124 of the different embodiments can have a hole diameter in a range of 1 µm to 100 µm. Additionally, as shown in FIG. 1(b) the ground contact element 105 can be made without the vertical cavity portions 114 in FIG. 1(a), where the non-active element can provide isolation across the first silicon layer 104.

FIG. 1(c) shows another embodiment of the CMUT cell and an array structure 100 according to the current invention. The array 100 of FIG. 1(c) includes the aspects of the embodiment of FIG. 1(b) in addition to the vertical cavity portions 114 in the ground element 105, and further includes the top electrode 122 disposed on the top surface of the membrane layer 118 that spans across the active cells 101, the non-active cell 103, and connects to the conductive top layer 134 of the ground element 105. Further, in this embodiment the first silicon layer 104 is an undoped silicon, and the conductive vias 124 are used to dope the isolated silicon layer portion 116, where the remainder of the first silicon layer 104 disposed on the ends of the cavity 110 remain undoped, as represented by the different area hatch marks in the first silicon layer 104.

In one aspect of the invention, as shown in FIGS. 1(c) and 1(f), the trenches 128 can be filled with an electrically insulating material 140 that can include air, epoxy, low temperature oxide, silicon nitride, polymer, PDMS, parylene, spin on glass, polyimide, TEOS, rubber, PMMA, and gel. It is understood that the electrically insulating material 140 can be applied to the trenches 128 in any of the embodiments of the current invention.

FIG. 1(d) shows another embodiment of the CMUT cell and an array structure 100 according to the current invention. The array 100 of FIG. 1(d) includes the aspects of the embodiment of FIG. 1(a), and further includes a second insulating layer 126 disposed on a top surface of the first silicon layer 106, on the walls of the vertical cavity portion 114 and on a top surface of the isolated silicon layer portion 116 of the first silicon layer 104, where the isolated silicon layer portion 116 is enveloped by the first insulating layer 106 and the second insulating layer 126. It is understood that the embodiment of FIG. 1(b) having the ground contact element 105 provided without the vertical cavity portion 114 can be used with all the embodiments in the current invention that do not have a second insulating layer 126.

FIG. 1(e) shows another embodiment of the CMUT cell and an array structure 100 according to the current invention. The array 100 of FIG. 1(e) includes the aspects of the embodiment of FIG. 1(d) with the vertical cavity portions 114 in FIG. 1(a), and further includes at least one conductive via 124 disposed through the second silicon layer 108 and into the isolated silicon layer 116, where the conductive via 124 is in contact with the bottom electrode layer 120.

In the above embodiments in FIGS. 1(d)-1(f), the second insulating layer 126 can be an insulating oxide layer having a thickness in a range from 10 nm to 30 µm. Further, the first insulating layer 106 disposed on the top surface of the second silicon layer 108 is thicker than a second insulating layer 126 disposed on the vertical cavity 114 portion and on the top surface of the isolated silicon layer portion 116. Here, the second insulating layer 126 disposed on the vertical cavity portion 114 and the top surface of the isolated silicon layer portion 116 has a thickness in a range of 1 nm to 10 µm.

FIG. 1(g) shows another embodiment of the CMUT cell and an array structure 100 according to the current invention. The array 100 of FIG. 1(g) includes the doped first silicon layer 104 and the first insulating layer 106 disposed on the doped first silicon layer 104. The cavity 110 is disposed in the first silicon layer 104, where the cross section of the cavity 110 includes a horizontal cavity portion 112 on top of vertical cavity portions 114 disposed at each end of the horizontal cavity portion 112, and vertical cavity portion 114 spans from the insulating layer 106 through the first silicon layer 104, where a portion of the first silicon layer 116 is isolated by the first insulating layer 106 and the cavity 110. The membrane layer 118 is disposed on the first silicon layer 118 top surface, where the membrane layer 118 spans across the cavity 110. Further, a bottom electrode 120 is disposed on a bottom surface of the first insulating layer 106. According to one aspect of the current embodiment, the first insulating layer 106 can be oxide, quartz, glass, pyrex, soda lime, borosilicate, borofloat glass, fused quartz, fused silica, alumina, or sapphire. A top electrode 122 (not shown) may be disposed on a top surface of the membrane layer 118. Here, the membrane layer 118 is shown as a conductive layer, however it can also be a nonconductive layer when used with a top electrode 122. Some exemplary materials that are useful materials for the membrane layer 118 can be undoped silicon, silicon nitride, undoped silicon carbide, nonconductive diamond, doped silicon, doped silicon carbide, and conductive diamond.

FIG. 1(h) shows another embodiment of the CMUT cell and an array structure 100 according to the current invention. The array 100 of FIG. 1(h) includes the aspects of the embodiment of FIG. 1(g), and further includes at least one conductive via 124 disposed through the second silicon layer 108 and into the isolated silicon layer 116, where the conductive via 124 is in contact with the bottom electrode layer 120.

FIG. 1(h) shows another embodiment of the CMUT cell and an array structure 100 according to the current invention. The array 100 of FIG. 1(h) includes the aspects of the embodiment of FIG. 1(i), however in this embodiment the first silicon layer 104 is an undoped silicon, and the conductive vias 124 are used to dope the isolated silicon layer portion 116, where the remainder of the first silicon layer 104 disposed on the ends of the cavity 110 remain undoped, as represented by the different area hatch marks in the first silicon layer 104.

According to one aspect of the invention, the silicon on insulator (SOI) substrate 102, having the first doped silicon layer 104 and the first insulating layer 106, are combined with the doped second silicon layer 108 forming a SOI wafer (not shown), where the SOI wafer has the doped first silicon layer 104, a buried first insulating layer 106 and doped second silicon layer 108, where the first insulating layer 106 is disposed between the first silicon layer 104 and the second silicon layer 108. Further, the first insulating layer 106 can be an oxide layer.

Figure 2:
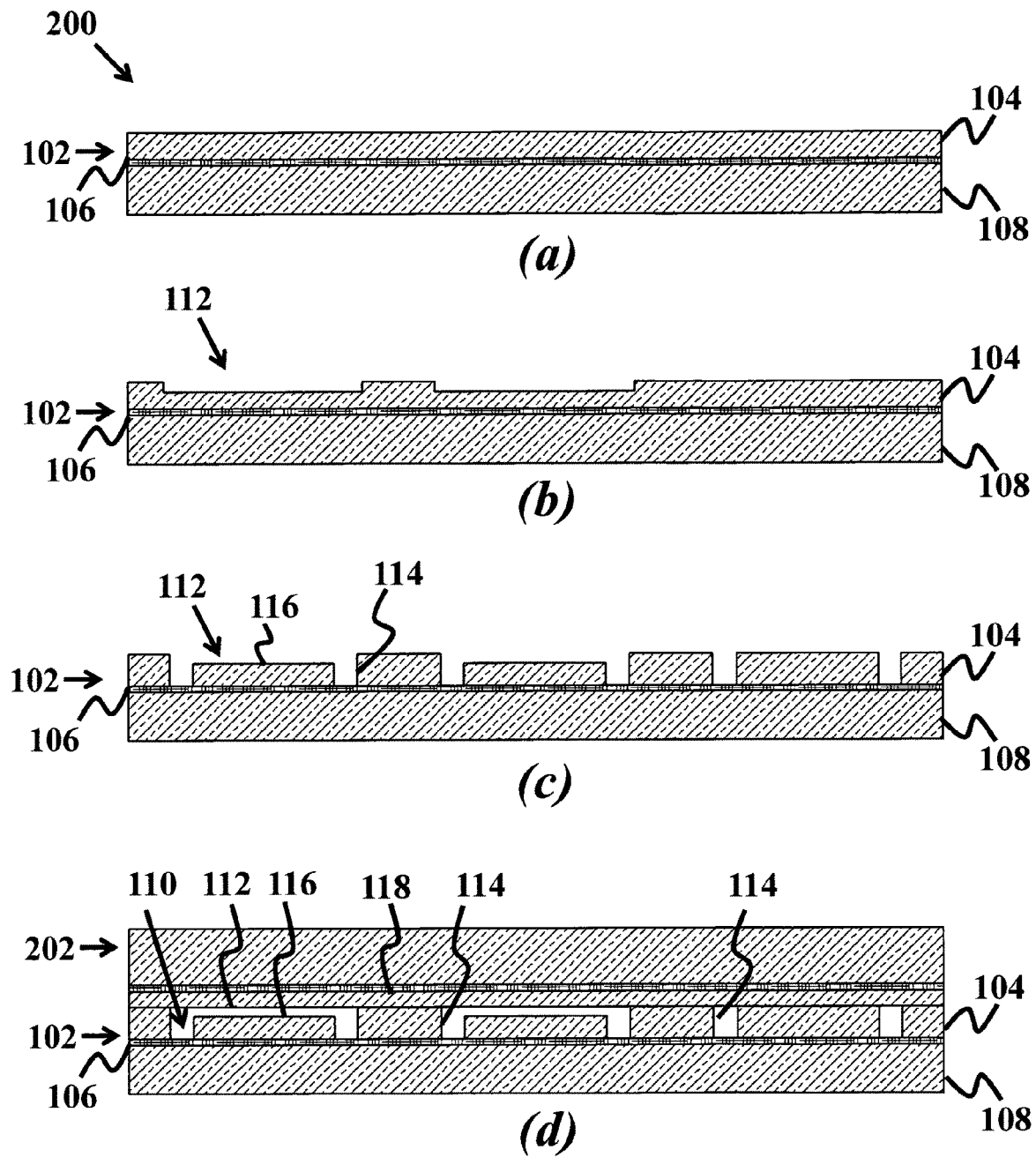
FIGS. 2(a)-2(i) show the steps of making different embodiments of the CMUT cell and an array structure according to the present invention.
Figure 2:
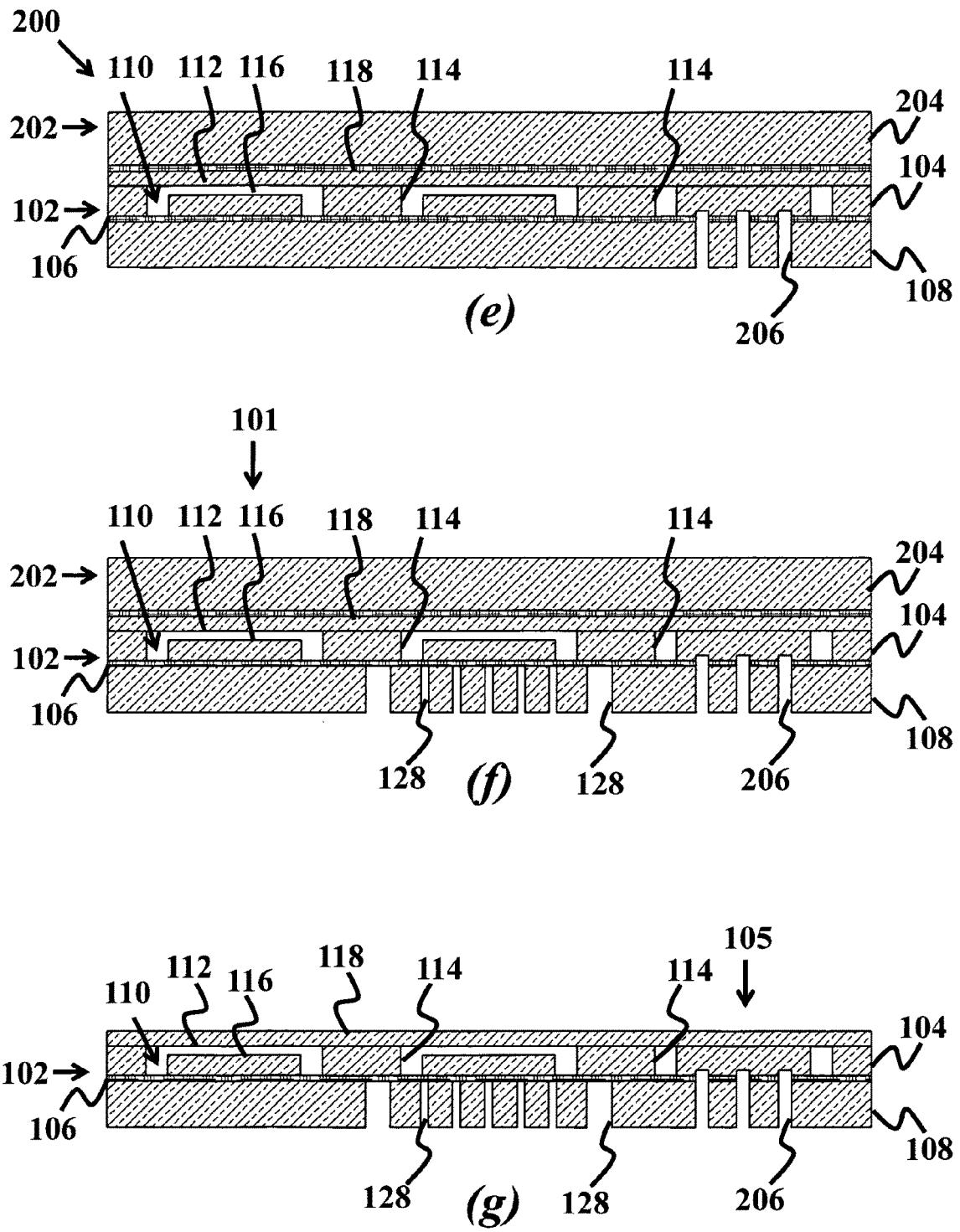
Figure 2:
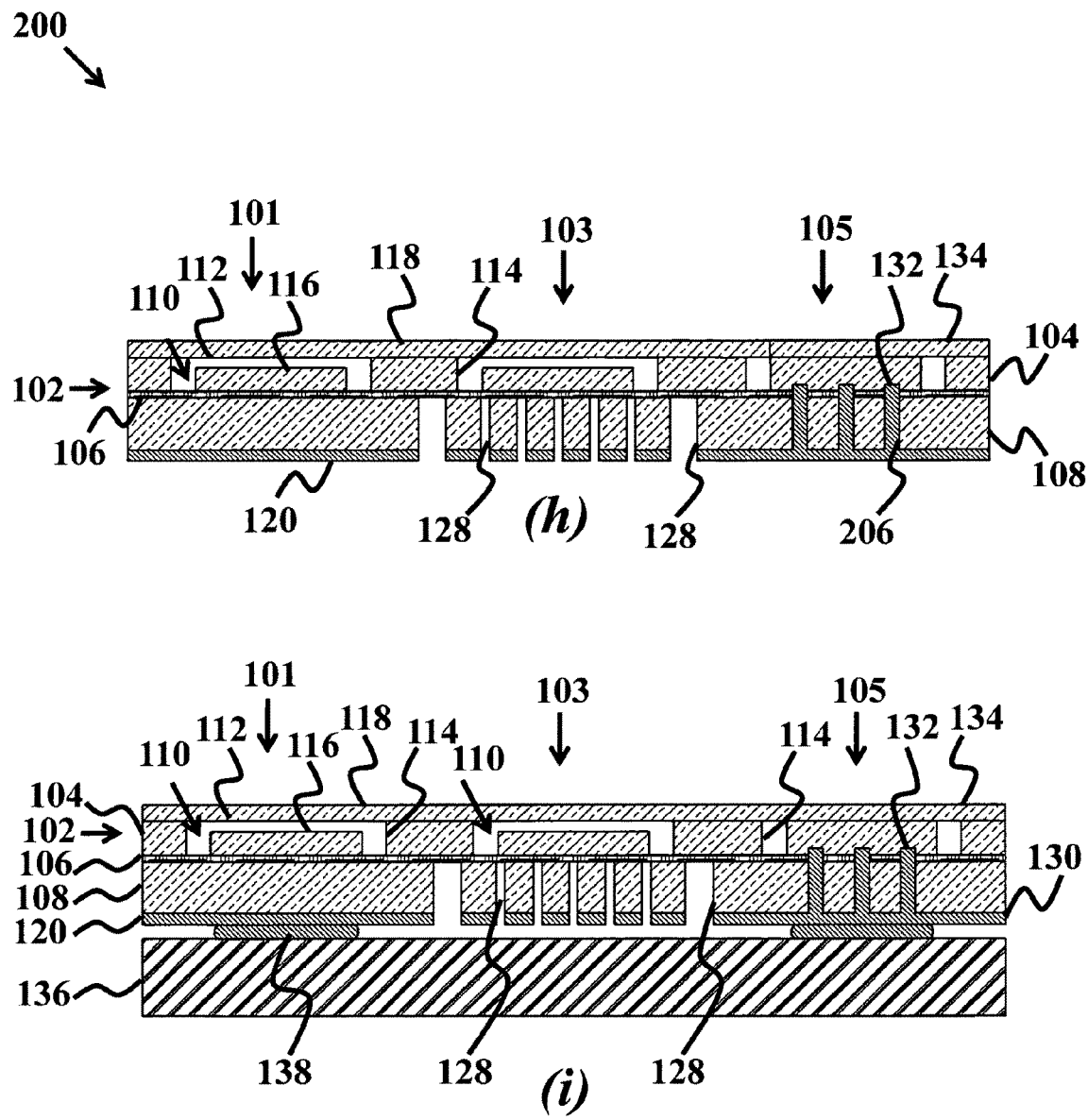

FIGS. 2(a)-2(i) show the steps for fabricating the CMUT cell and an array structure 100 described in FIG. 1(a) according to one embodiment of the invention. Beginning with FIG. 2(a) the steps include providing the first silicon on insulator (SOI) substrate 102 that has the doped first silicon layer 104 and the first insulating layer 106, and providing the doped second silicon layer 108, where the first insulating layer 106 is disposed between the first silicon layer 104 and the second silicon layer 108. FIG. 2(b) shows the step of forming the horizontal cavity portions 112 in the first silicon layer 104. FIG. 2(c) shows the step of forming the vertical cavity portions 114 at each end of the horizontal cavity portion 112, where the vertical cavity portion 114 spans from the first insulating layer 106 through the first silicon layer 104. FIG. 2(d) shows the step of bonding a silicon substrate 202 to the top surface of the first silicon layer 104, where a bottom region of the silicon substrate 202 is the membrane layer 118, and the top region 204 provides a means of manipulating the structure during fabrication. FIG. 2(e) shows the step of forming at least one ground contact hole 206 in the second silicon layer 108. FIG. 2(f) shows the step of forming at least one trench 128 in the second silicon layer 108 surrounding the ground contact element 105 and/or surrounding the active elements 101. FIG. 2(g) shows the step of removing the top region 204 of the silicon substrate 202, where the membrane layer 118 spans at least across the active elements 101, and can extend across the ground contact element 105 as shown. FIG. 2(h) shows the steps of providing conductive material to the ground contact hole 206 to form the ground conductive via 132, depositing the bottom electrode layer 120 on the bottom of the second silicon layer 108, depositing the conductive top layer 134 to the exposed isolated silicon layer portion 116 of the ground contact element 105 that electrically conducts with the membrane layer 118, and depositing the top electrode 122 on the top of the membrane layer, wherein it is understood that the top electrode could be omitted when membrane layer 118 is electrically conductive and used as the top electrode layer, as discussed above. FIG. 2(i) shows step of bonding the separate electronic unit 136, where the bottom electrodes 120/130 and the ground electrode 130 are conductively connected 138 to the electronic unit 136.

Figure 3:
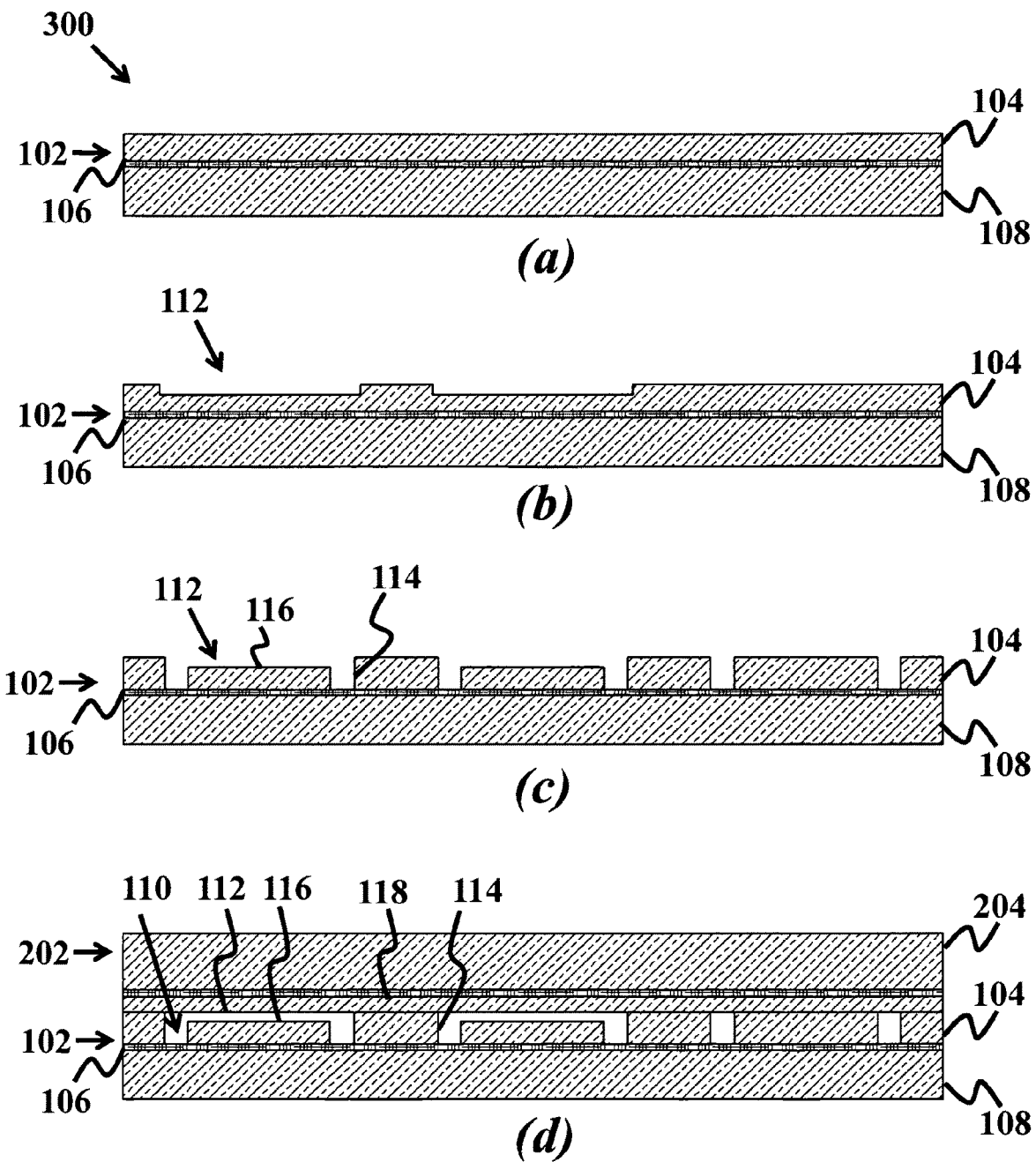
FIGS. 3(a)-3(i) show the steps of making different embodiments of the CMUT cell and an array structure according to the present invention.
Figure 3:
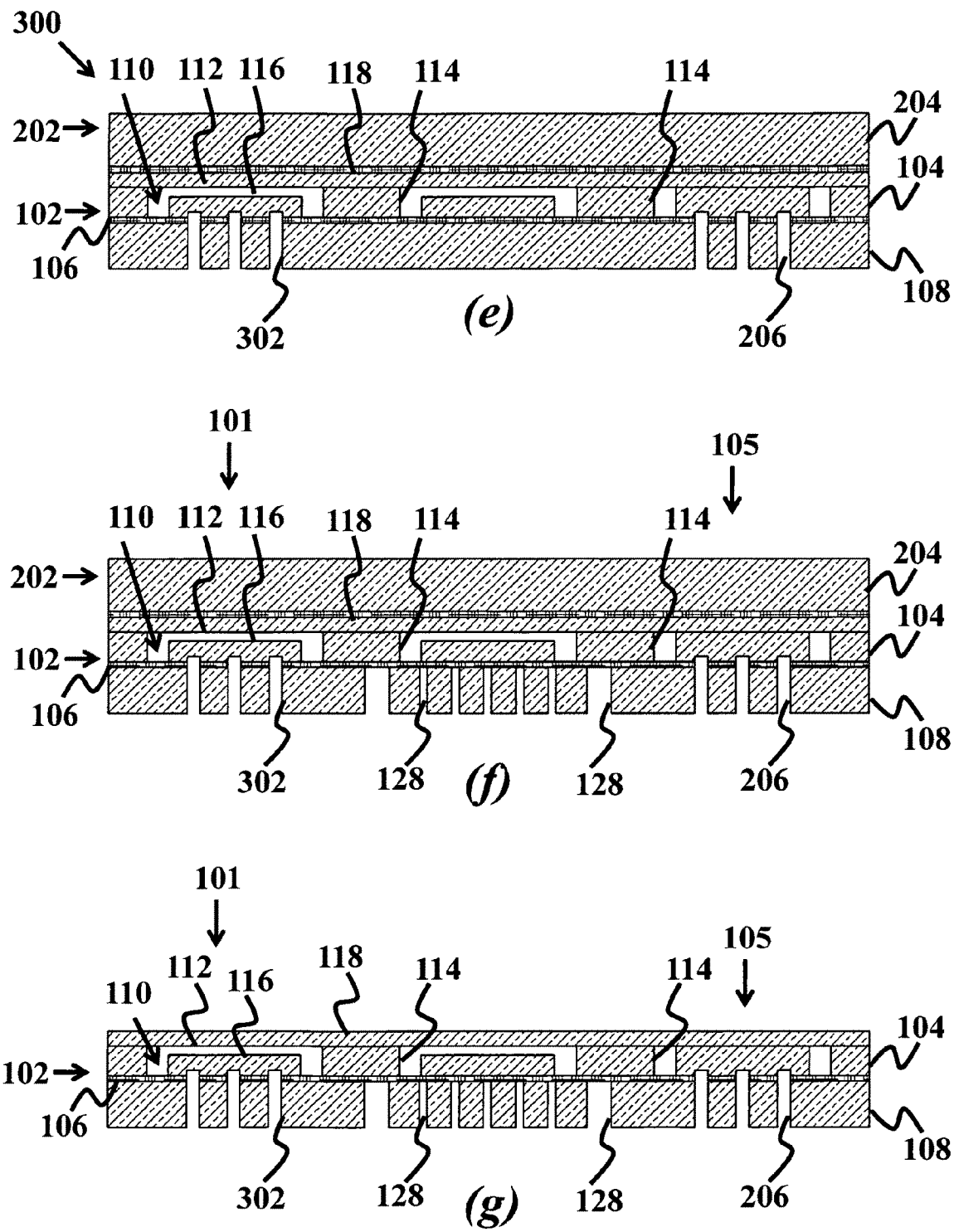
Figure 3:
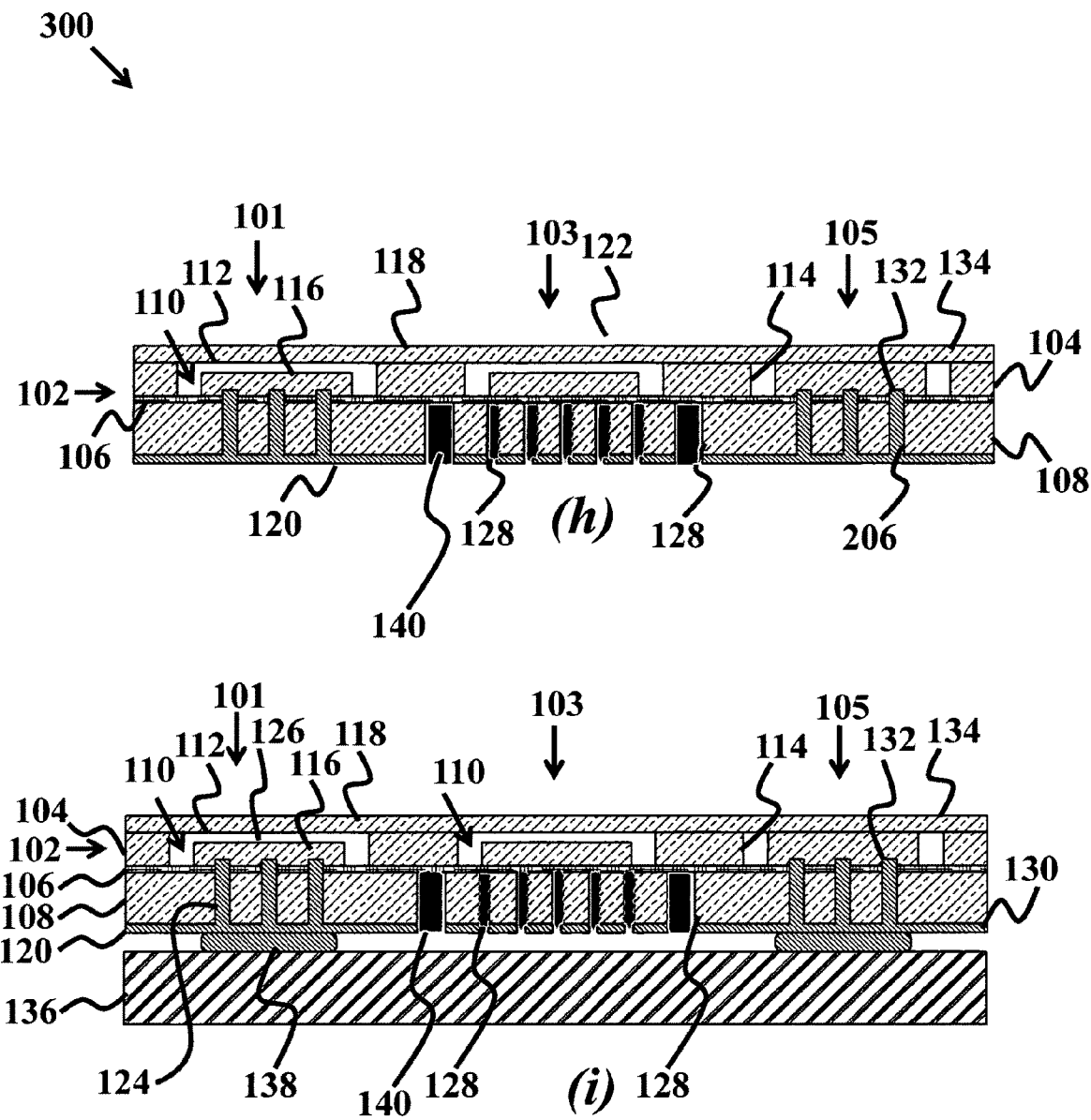

FIGS. 3(a)-3(i) show the steps for fabricating the CMUT cell and an array structure 100 described in FIG. 1(b) according to one embodiment of the invention. Beginning with FIG. 3(a) the steps include providing the first silicon on insulator (SOI) substrate 102 that has the doped first silicon layer 104 and the first insulating layer 106, and providing the doped second silicon layer 108, where the first insulating layer 106 is disposed between the first silicon layer 104 and the second silicon layer 108. FIG. 3(b) shows the step of forming the horizontal cavity portions 112 in the first silicon layer 104. FIG. 3(c) shows the step of forming the vertical cavity portions 114 at each end of the horizontal cavity portion 112, where the vertical cavity portion 114 spans from the first insulating layer 106 through the first silicon layer 104. FIG. 3(d) shows the step of bonding a silicon substrate 202 to the top surface of the first silicon layer 104, where a bottom region of the silicon substrate 202 is the membrane layer 118, and the top region 204 provides a means of manipulating the structure during fabrication, providing additional mechanical support, mechanical protection and providing protection against contamination in the cell cavities from particles. FIG. 3(e) shows the step of forming at least one ground contact hole 206 in the second silicon layer 108, and forming at least one active element contact hole 302 in the second silicon layer 108. FIG. 3(f) shows the step of forming at least one trench 128 in the second silicon layer 108 surrounding the ground contact element 105 and/or surrounding the active elements 101. FIG. 3(g) shows the step of removing the top region 204 of the silicon substrate 202, where the membrane layer 118 spans at least across the active elements 101, and the isolated silicon layer portion 116 of the ground contact element 105 is exposed. FIG. 3(h) shows the steps of providing conductive material to the ground conducting element contact hole 206 to form the ground conductive via 132, similarly providing conductive material to the active element contact hole 302, depositing the bottom electrode layer 120 on the bottom of the second silicon layer 108, depositing the conductive top layer 134 to the exposed isolated silicon layer portion 116 of the ground contact element 105 that electrically conducts with the membrane layer 118, and depositing the top electrode 122 on the top of the membrane layer, wherein it is understood that the top electrode could be omitted when membrane layer 118 is electrically conductive and used as the top electrode layer, as discussed above. Further shown in FIG. 3(h) is the step of providing the electrically insulating material 140 to the trenches 128, where it is understood that this step may be applied to the other embodiments of the current invention. FIG. 3(i) shows step of bonding the separate electronic unit 136, where the bottom electrodes 120/130 and the ground electrode 130 are conductively connected 138 to the electronic unit 136.

Figure 4:
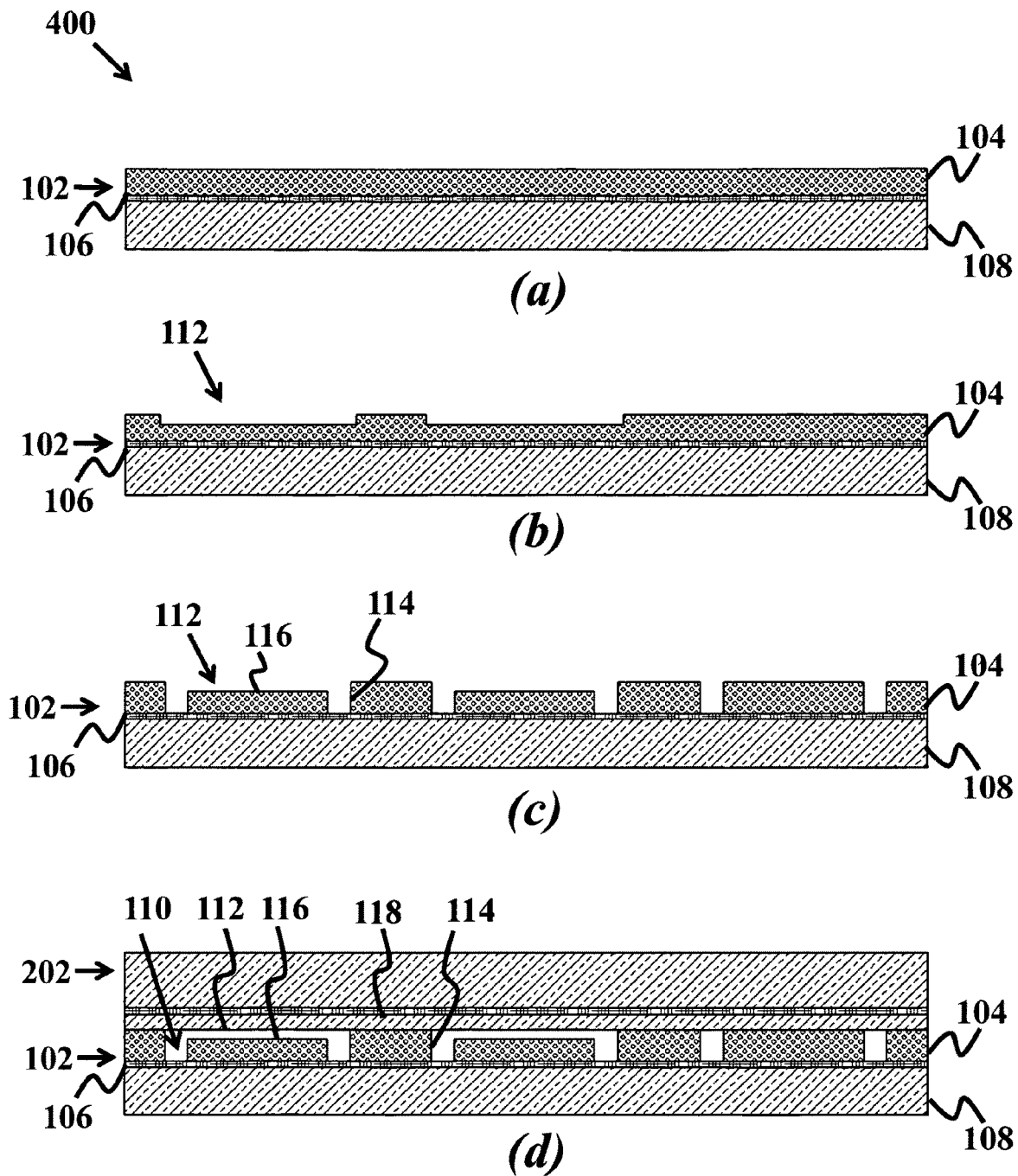
FIGS. 4(a)-4(i) show the steps of making different embodiments of the CMUT cell and an array structure according to the present invention.
Figure 4:
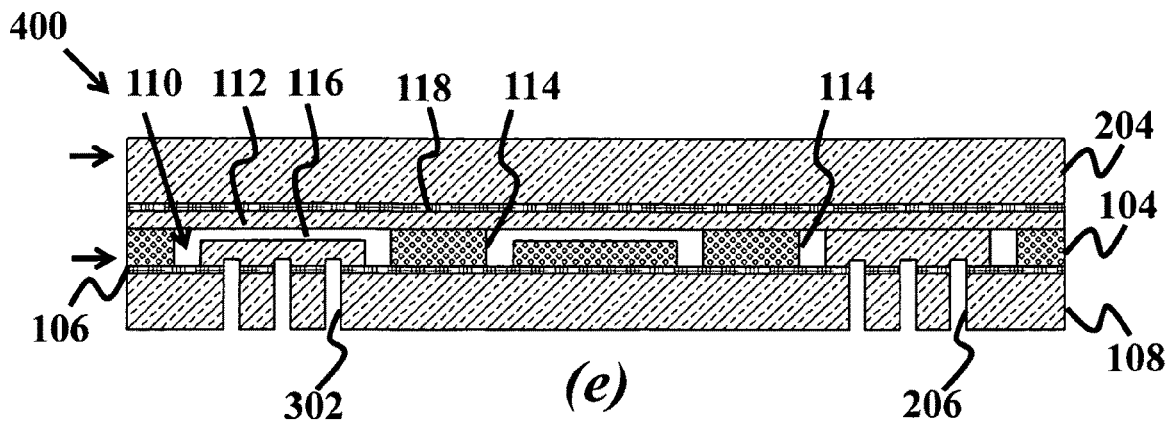
Figure 4:
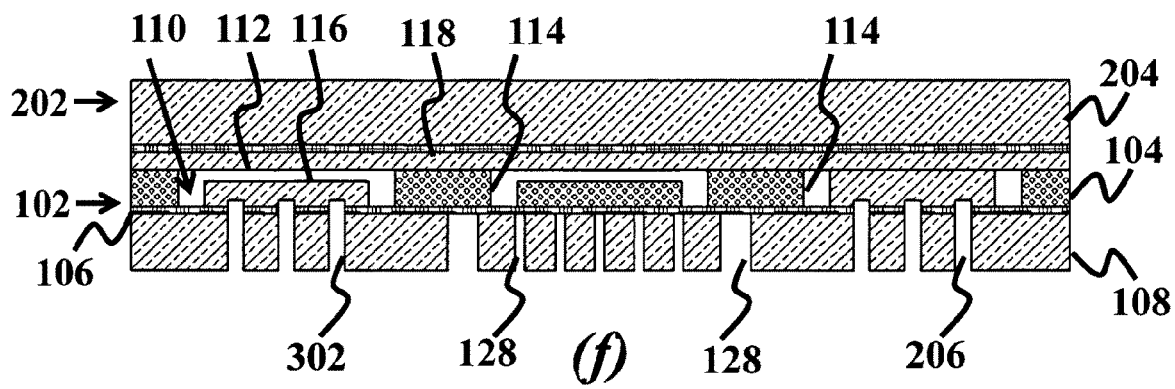
Figure 4:
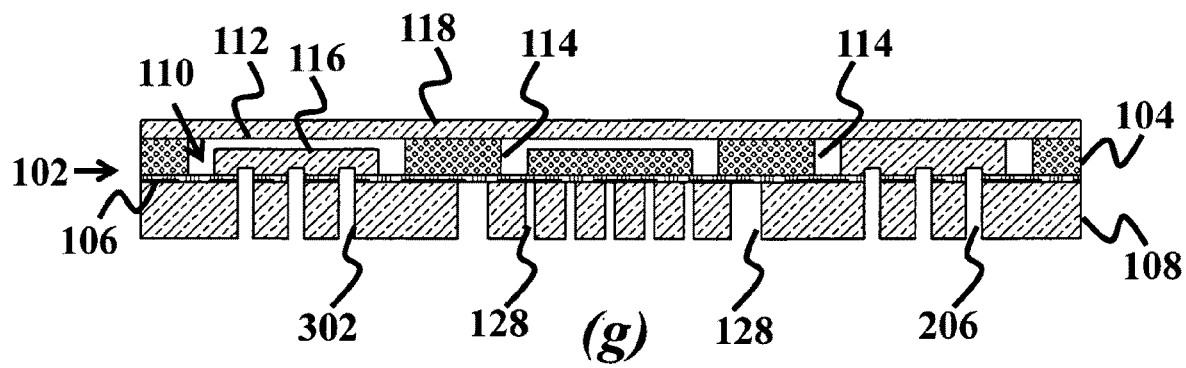
Figure 4:
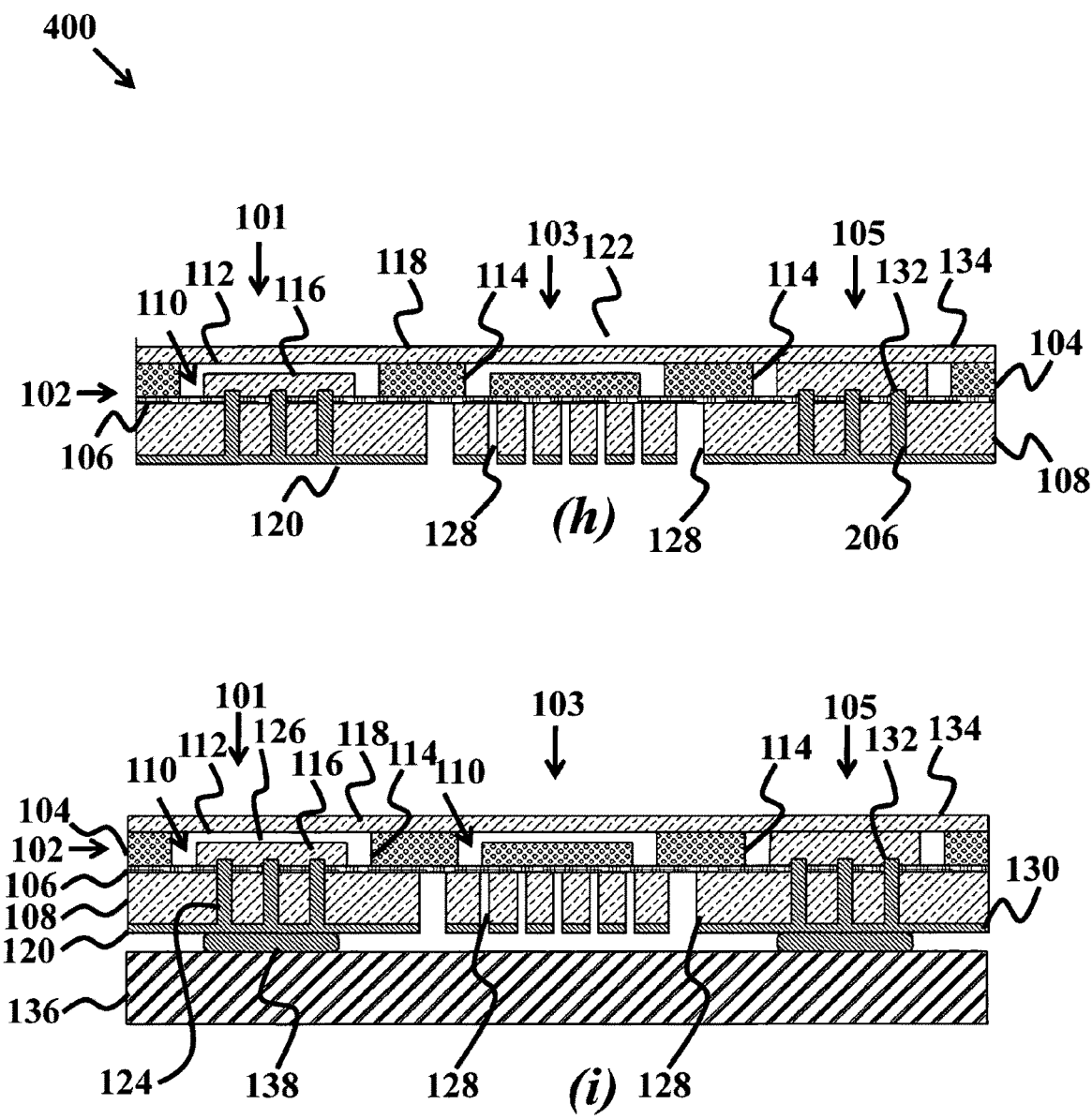

FIGS. 4(a)-4(i) show the steps for fabricating the CMUT cell and an array structure 100 described in FIG. 1(c) according to one embodiment of the invention. Beginning with FIG. 4(a) the steps include providing the first silicon on insulator (SOI) substrate 102 where the first SOI substrate 102 has an undoped first silicon layer 104, and the isolated silicon layer 116 is undoped, and providing the doped second silicon layer 108, where the first insulating layer 106 is disposed between the first silicon layer 104 and the second silicon layer 108. FIG. 4(b) shows the step of forming the horizontal cavity portions 112 in the first silicon layer 104. FIG. 4(c) shows the step of forming the vertical cavity portions 114 at each end of the horizontal cavity portion 112, where the vertical cavity portion 114 spans from the first insulating layer 106 through the first silicon layer 104. FIG. 4(d) shows the step of bonding a silicon substrate 202 to the top surface of the first silicon layer 104, where a bottom region of the silicon substrate 202 is the membrane layer 118, and the top region 204 provides a means of manipulating the structure during fabrication. FIG. 4(e) shows the step of forming at least one ground contact hole 206 in the second silicon layer 108, and forming at least one active element contact hole 302 in the second silicon layer 108. According to the current embodiment, because the first silicon layer 104 is an undoped silicon, the holes 206/302 are used to dope the isolated silicon layer portion 116, where the remainder of the first silicon layer 104 disposed on the ends of the cavity 110 remain undoped, as represented by the different area hatch marks in the first silicon layer 104. FIG. 4(f) shows the step of forming at least one trench 128 in the second silicon layer 108 surrounding the ground contact element 105 and/or surrounding the active elements 101. FIG. 4(g) shows the step of removing the top region 204 of the silicon substrate 202, where the membrane layer 118 spans at least across the active elements 101, and the isolated silicon layer portion 116 of the ground contact element 105 is exposed. FIG. 4(h) shows the steps of providing conductive material to the ground contact hole 206 to form the ground conductive via 132, providing conductive material to the active element contact hole 302 to form a conductive via 124. The steps shown in FIG. 4(h) further include depositing the bottom electrode layer 120 on the bottom of the second silicon layer 108, depositing the conductive top layer 134 to the exposed isolated silicon layer portion 116 of the ground contact element 105 that electrically conducts with the membrane layer 118, and depositing the top electrode 122 on the top of the membrane layer, wherein it is understood that the top electrode could be omitted when membrane layer 118 is electrically conductive and used as the top electrode layer, as discussed above. FIG. 4(i) shows step of bonding the separate electronic unit 136, where the bottom electrodes 120/130 and the ground electrode 130 are conductively connected 138 to the electronic unit 136.

Figure 5:
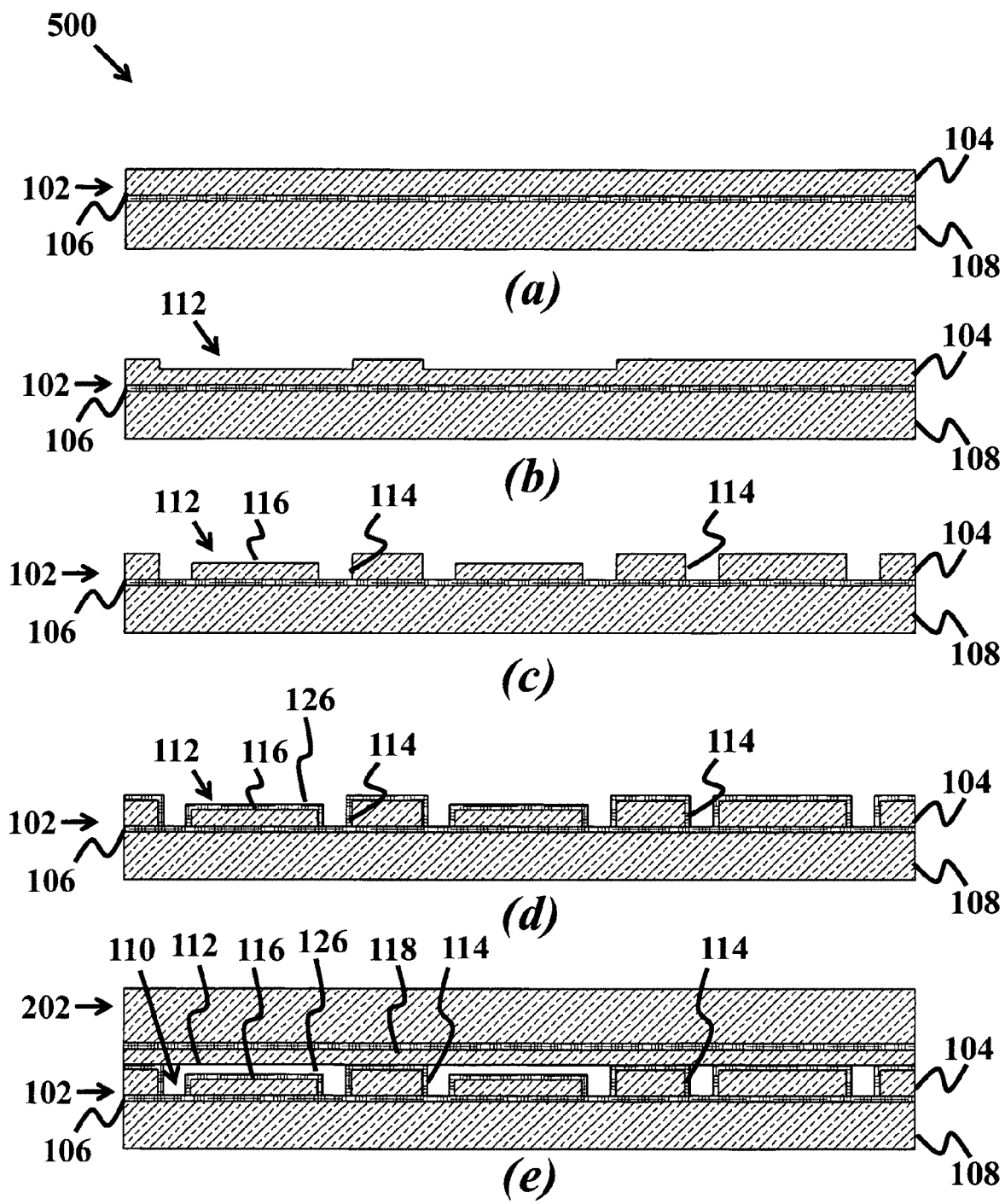
FIGS. 5(a)-5(j) show the steps of making different embodiments of the CMUT cell and an array structure according to the present invention.
Figure 5:
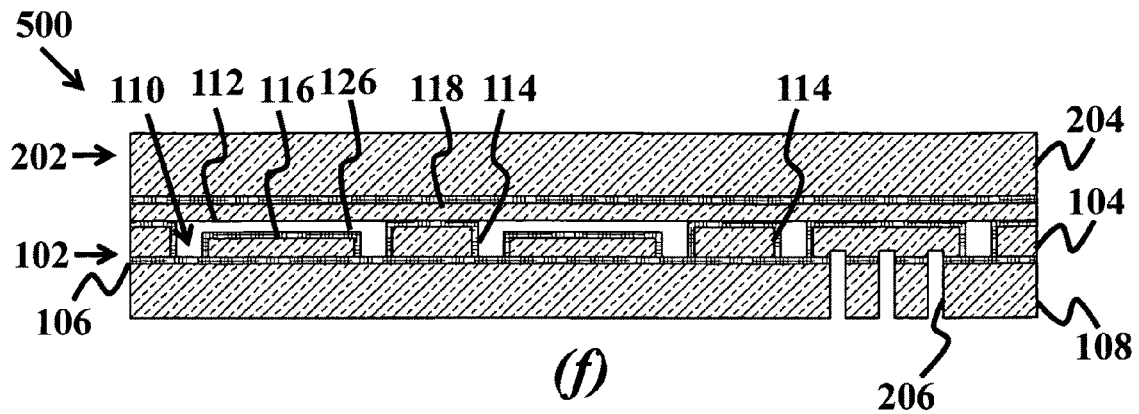
Figure 5:
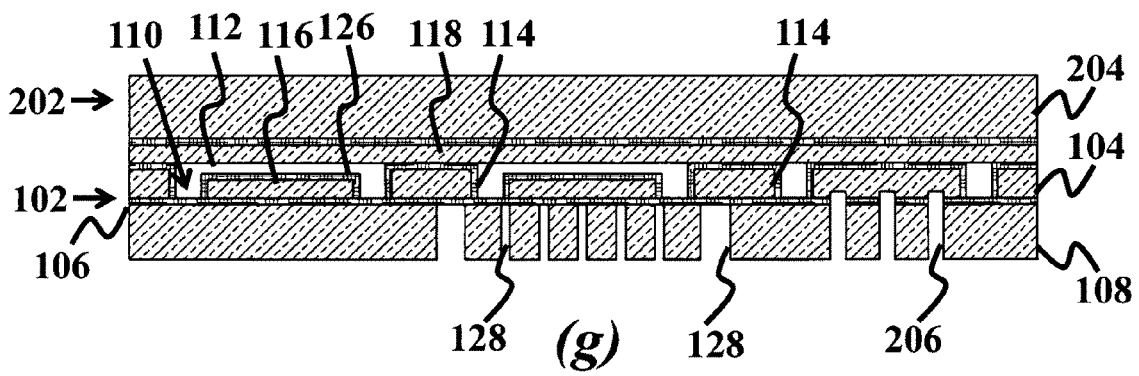
Figure 5:
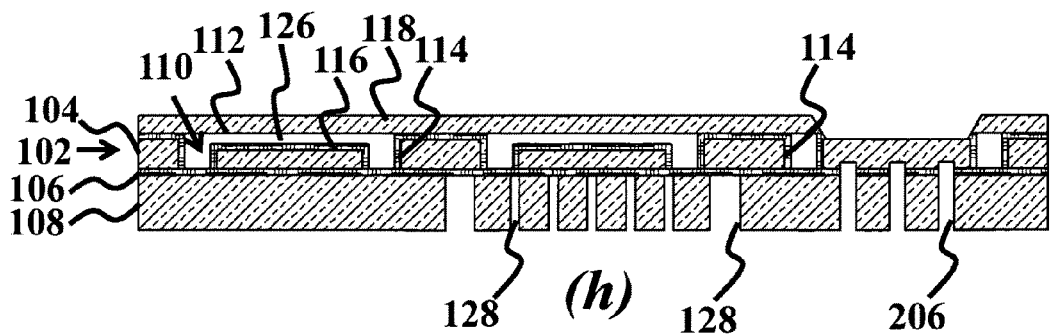
Figure 5:
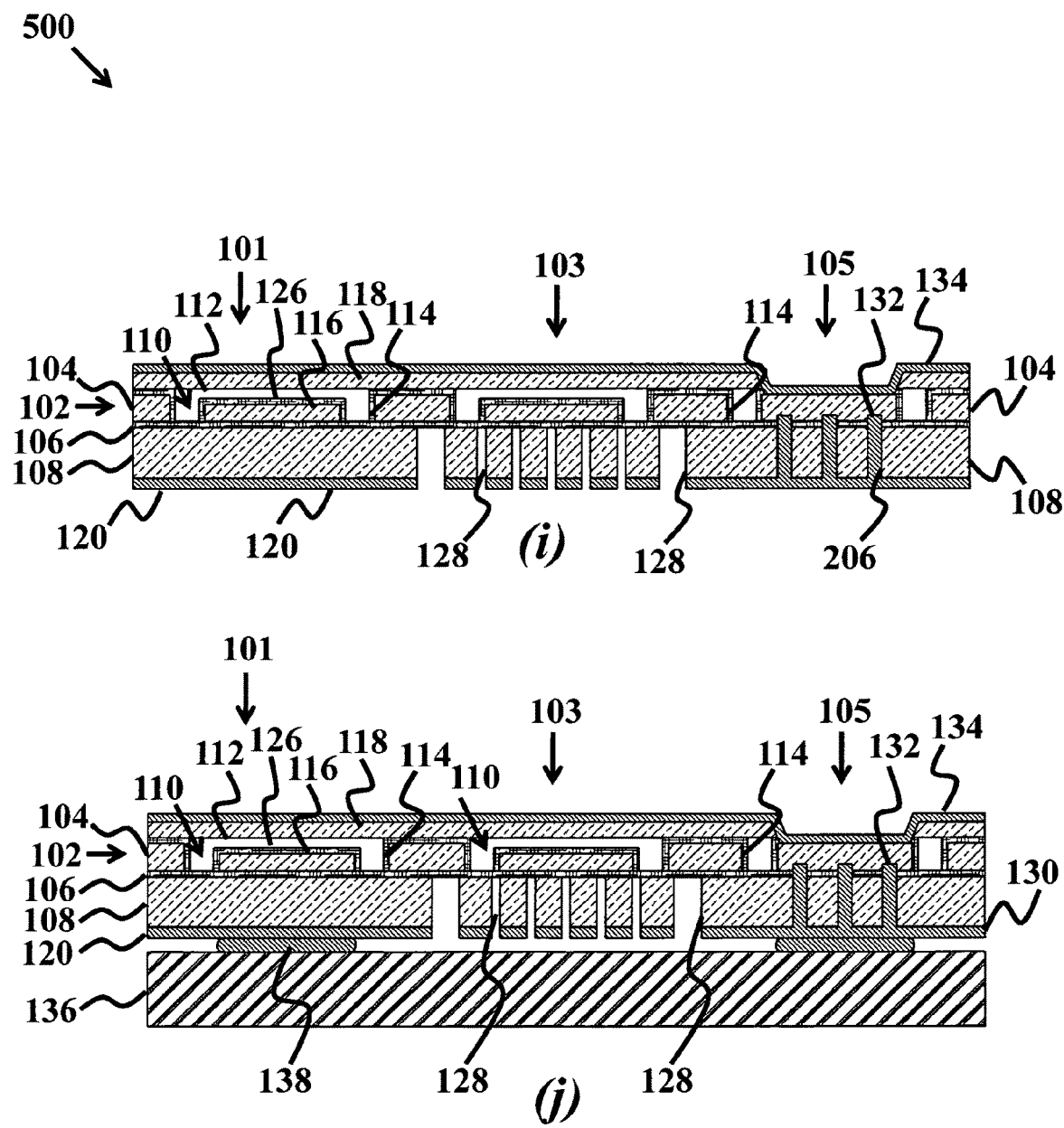
Figure 6:
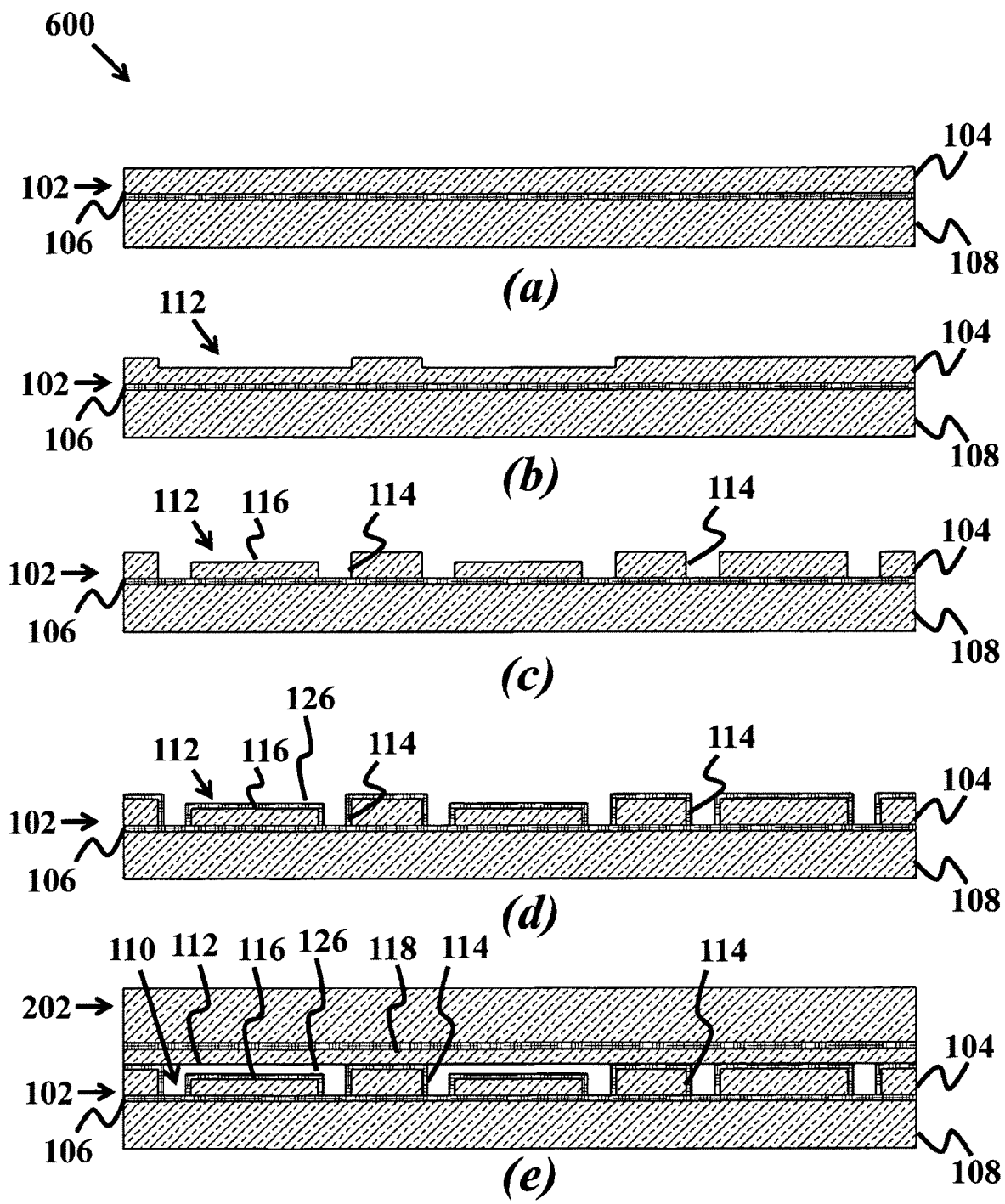
FIGS. 6(a)-6(j) show the steps of making different embodiments of the CMUT cell and an array structure according to the present invention.
Figure 6:
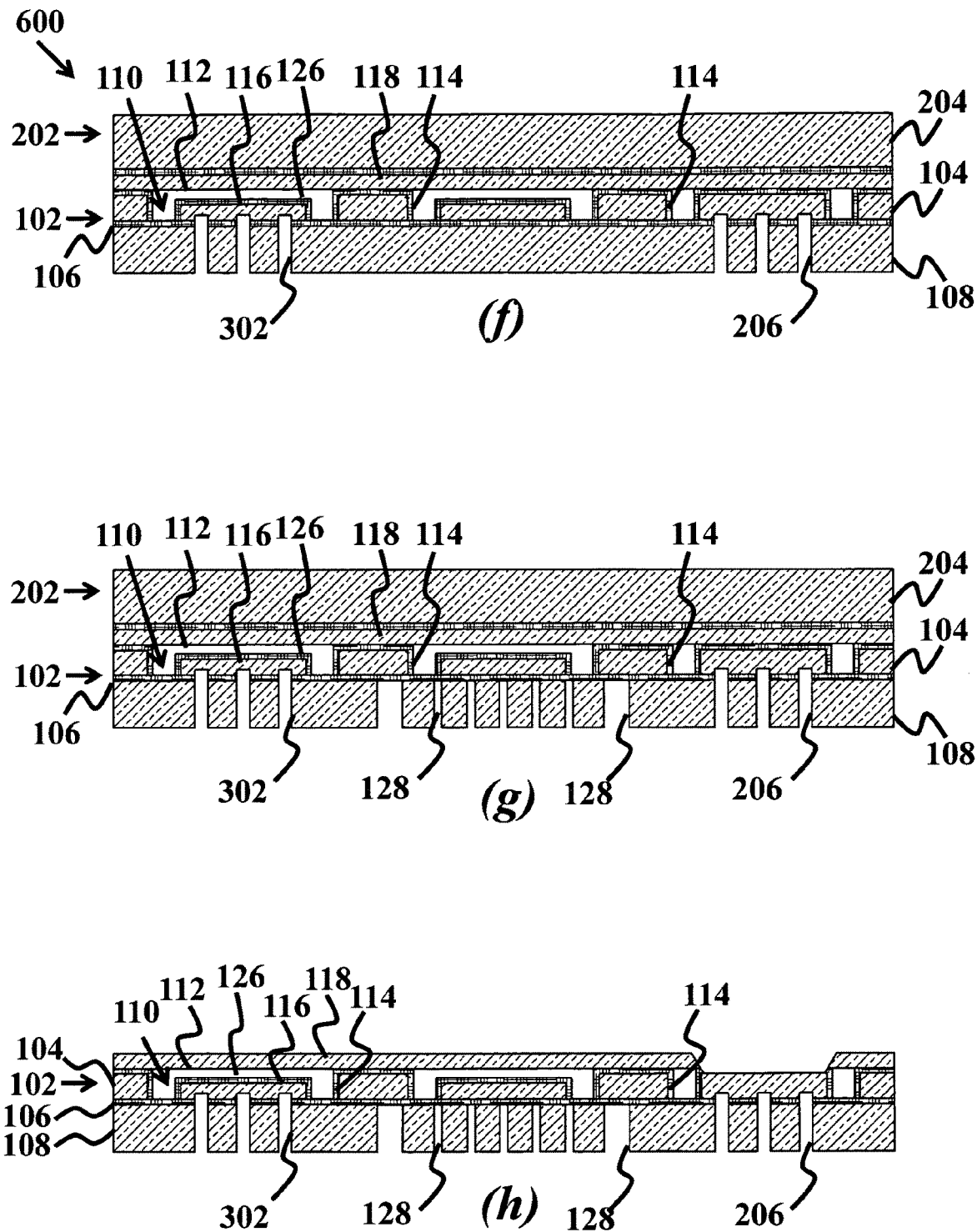
Figure 6:
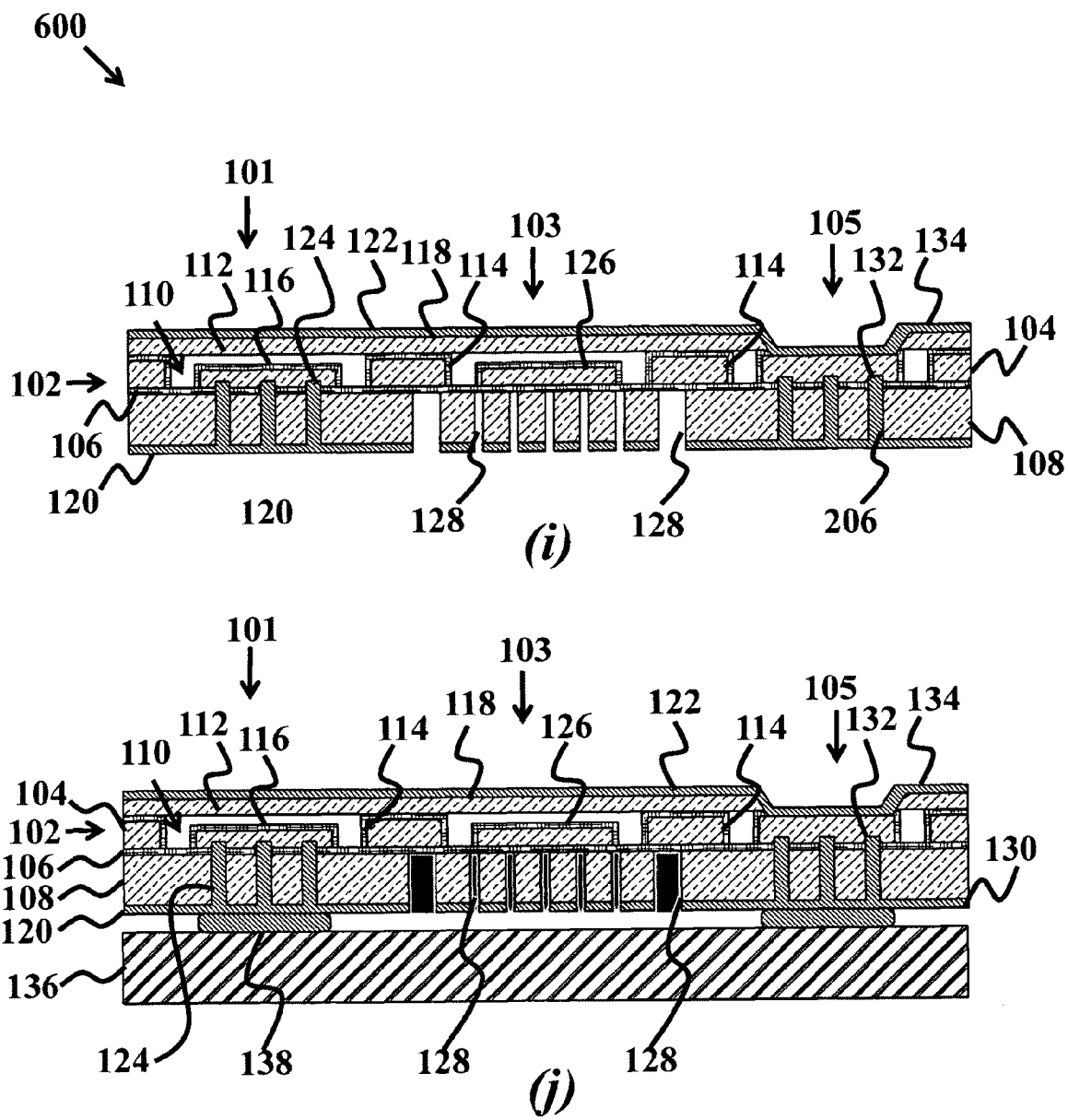
Figure 7:
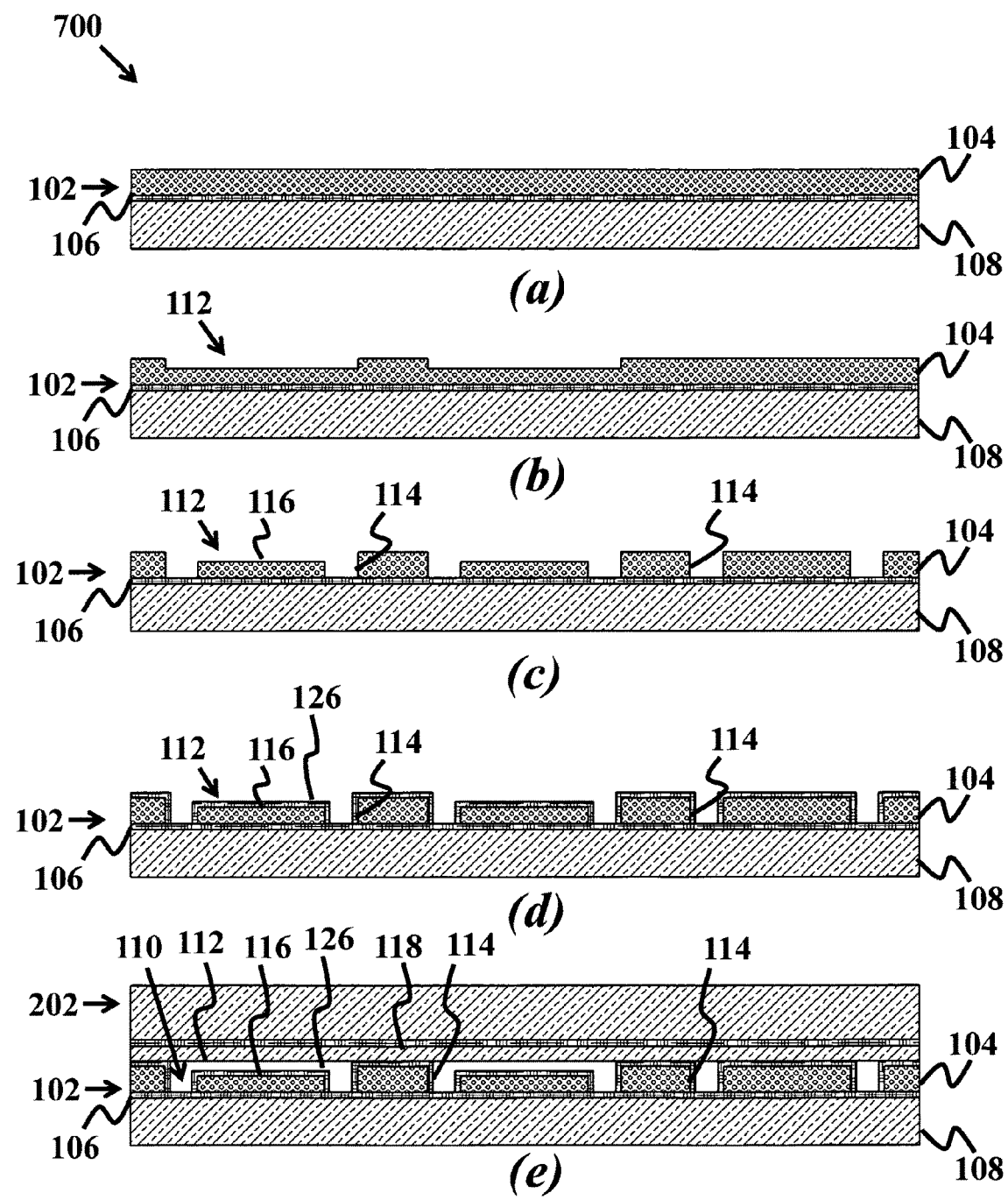
FIGS. 7(a)-7(j) show the steps of making different embodiments of the CMUT cell and an array structure according to the present invention.
Figure 7:
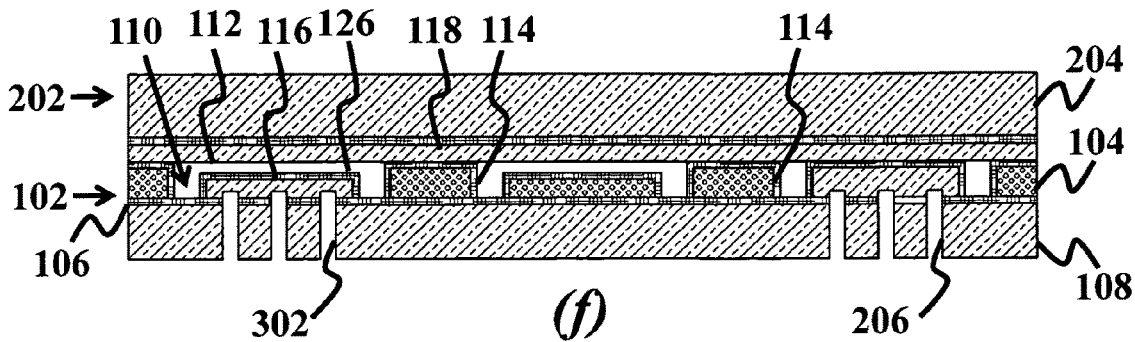
Figure 7:
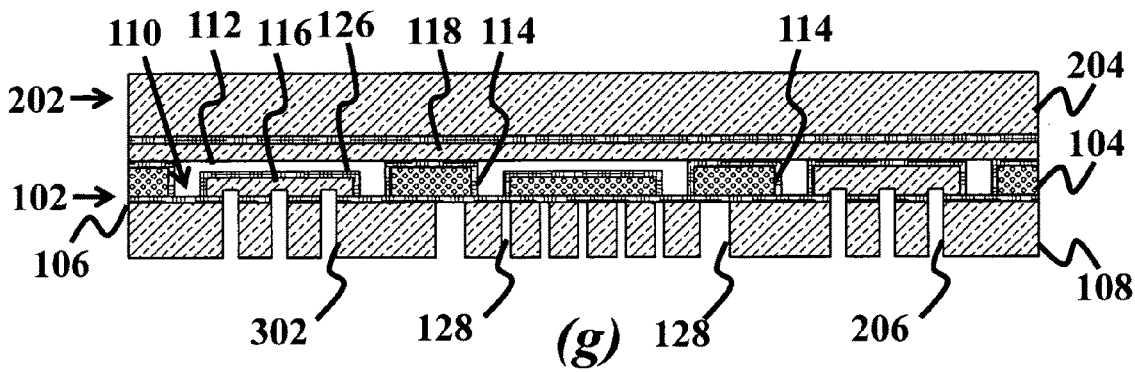
Figure 7:
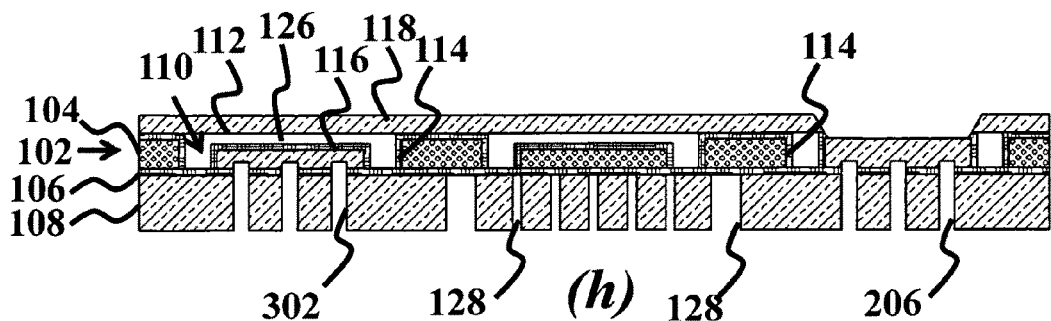
Figure 7:
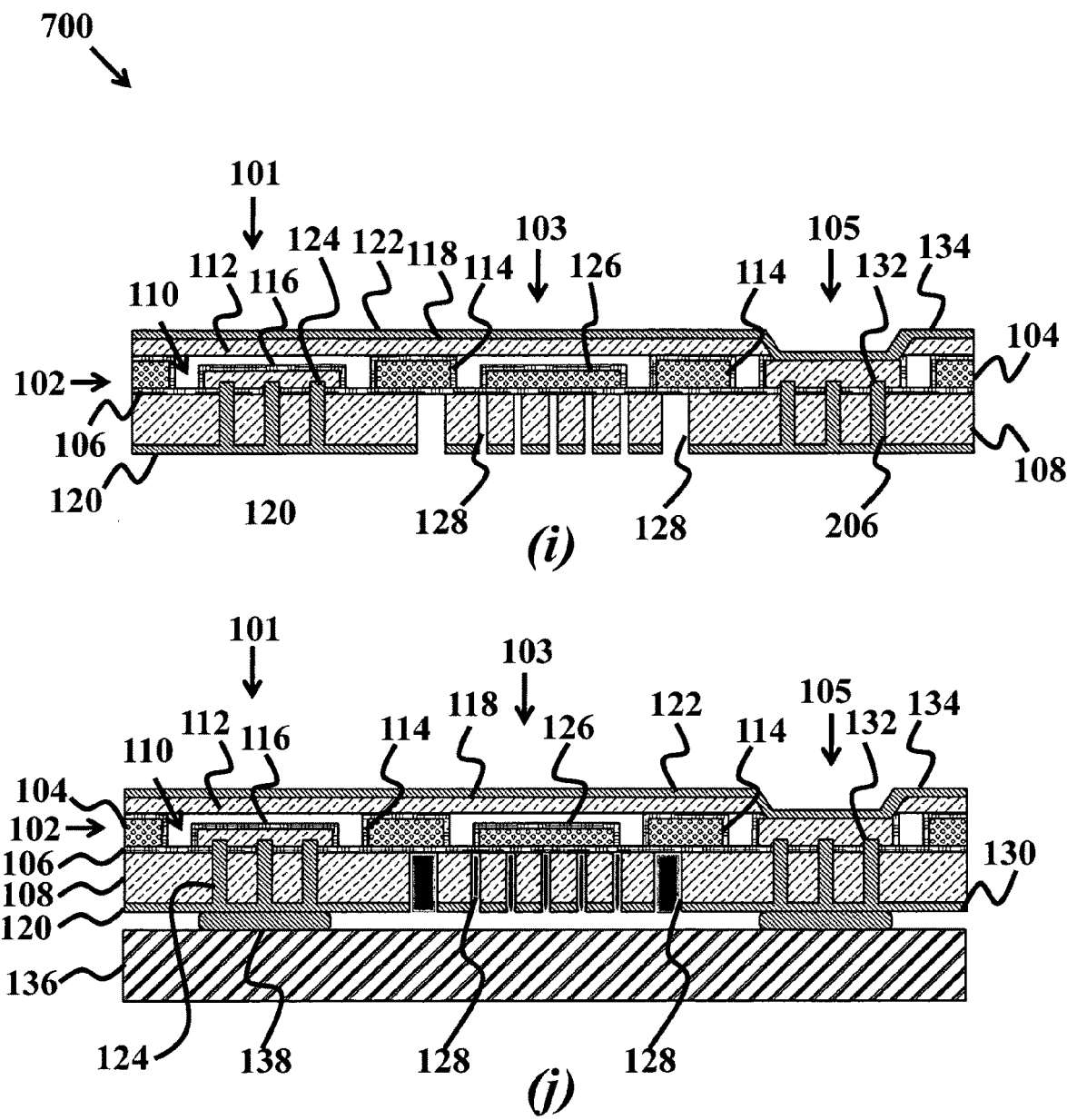

It is understood that though the conducting top layer 134 is shown in the figures where there is no second insulating layer on the top of the first silicon layer 102 (see FIGS. 5-7), there is no need to provide the conducting top layer 134 when there is electrical continuity from the ground electrode 120, through the conducting via 132 to the doped first silicon layer 104 and to the membrane layer 118. In the embodiments of FIGS. 5-7 the second insulating layer 126 is disposed on the top surface of the first silicon layer 104 and the second insulating 126 layer must be removed. In order to remove that layer, a portion of the membrane layer 118 must be removed to expose the first silicon layer 104 of the contact ground element 105.

FIGS. 5(a)-5(i) show the steps for fabricating the CMUT cell and an array structure 100 described in FIG. 1(d) according to one embodiment of the invention. Beginning with FIG. 5(a) the steps include providing the first silicon on insulator (SOI) substrate 102 that has the doped first silicon layer 104 and the first insulating layer 106, and providing the doped second silicon layer 108, where the first insulating layer 106 is disposed between the first silicon layer 104 and the second silicon layer 108. FIG. 5(b) shows the step of forming the horizontal cavity portions 112 in the first silicon layer 104. FIG. 5(c) shows the step of forming the vertical cavity portions 114 at each end of the horizontal cavity portion 112, where the vertical cavity portion 114 spans from the first insulating layer 106 through the first silicon layer 104. FIG. 5(d) shows the step of depositing a second insulating layer 126 on the walls of the vertical cavity portion 114 and on a top surface of the isolated silicon layer portion 116 of the first silicon layer 104, where the isolated silicon layer portion 116 is enveloped by the first insulating layer 106 and the second insulating layer 126. FIG. 5(e) shows the step of bonding a silicon substrate 202 to the second insulating layer 126 of the top surface of the first silicon layer 104, where a bottom region of the silicon substrate is the conductive membrane layer 118. FIG. 5(f) shows the step of forming at least one ground contact hole 206 in the second silicon layer 108. FIG. 5(g) shows the step of forming at least one trench 128 in the second silicon layer 108 surrounding the ground contact element 105 and/or surrounding the active elements 101. FIG. 5(h) shows the step of removing the top region 204 of the silicon substrate 202 and a portion of the second insulating layer 126 on the isolate silicon layer portion of the ground element 105, where the membrane layer 118 spans at least across the active elements 101, and the isolated silicon layer portion 116 of the ground contact element 105 is exposed. FIG. 5(i) shows the steps of providing conductive material to the ground contact hole 206 to form the ground conductive via 132, depositing the bottom electrode layer 120 on the bottom of the second silicon layer 108, depositing the conductive top layer 134 to the exposed isolated silicon layer portion 116 of the ground contact element 105 that electrically conducts with the membrane layer 118, and depositing the top electrode 122 on the top of the membrane layer, wherein it is understood that the top electrode could be omitted when membrane layer 118 is electrically conductive and used as the top electrode layer, as discussed above. FIG. 5(j) shows step of bonding the separate electronic unit 136, where the bottom electrodes 120/130 and the ground electrode 130 are conductively connected 138 to the electronic unit 136.

FIGS. 6(a)-6(j) show the steps for fabricating the CMUT cell and an array structure 100 described in FIG. 1(e) according to one embodiment of the invention. Beginning with FIG. 6(a) the steps include providing the first silicon on insulator (SOI) substrate 102 that has the doped first silicon layer 104 and the first insulating layer 106, and providing the doped second silicon layer 108, where the first insulating layer 106 is disposed between the first silicon layer 104 and the second silicon layer 108. FIG. 6(b) shows the step of forming the horizontal cavity portions 112 in the first silicon layer 104. FIG. 6(c) shows the step of forming the vertical cavity portions 114 at each end of the horizontal cavity portion 112, where the vertical cavity portion 114 spans from the first insulating layer 106 through the first silicon layer 104. FIG. 6(d) shows the step of depositing a second insulating layer 126 on the walls of the vertical cavity portion 114 and on a top surface of the isolated silicon layer portion 116 of the first silicon layer 104, where the isolated silicon layer portion 116 is enveloped by the first insulating layer 106 and the second insulating layer 126. FIG. 6(e) shows the step of bonding a silicon substrate 202 to the second insulating layer 126 of the top surface of the first silicon layer 104, where a bottom region of the silicon substrate is the conductive membrane layer 118. FIG. 6(f) shows the step of forming at least one ground contact hole 206 in the second silicon layer 108, and forming at least one active element contact hole 302 in the second silicon layer 108. FIG. 6(g) shows the step of forming at least one trench 128 in the second silicon layer 108 surrounding the ground contact element 105 and/or surrounding the active elements 101. FIG. 6(h) shows the step of removing the top region 204 of the silicon substrate 202 and a portion of the second insulating layer 126 on the isolate silicon layer portion of the ground element 105, where the membrane layer 118 spans at least across the active elements 101, and the isolated silicon layer portion 116 of the ground contact element 105 is exposed. FIG. 6(i) shows the steps of providing conductive material to the ground contact hole 206 to form the ground conductive via 132, providing conductive material to the active element contact hole 302 to form a conductive via 124, depositing the bottom electrode layer 120 on the bottom of the second silicon layer 108, depositing the conductive top layer 134 to the exposed isolated silicon layer portion 116 of the ground contact element 105 that electrically conducts with the membrane layer 118, and depositing the top electrode 122 on the top of the membrane layer, wherein it is understood that the top electrode could be omitted when membrane layer 118 is electrically conductive and used as the top electrode layer, as discussed above. FIG. 6(j) shows step of bonding the separate electronic unit 136, where the bottom electrodes 120/130 and the ground electrode 130 are conductively connected 138 to the electronic unit 136.

FIGS. 7(a)-7(j) show the steps for fabricating the CMUT cell and an array structure 100 described in FIG. 1(f) according to one embodiment of the invention. Beginning with FIG. 6(a) the steps include providing the first silicon on insulator (SOI) substrate 102 where the first SOI substrate 102 has an undoped first silicon layer 104, and the isolated silicon layer 116 is undoped, and providing the doped second silicon layer 108, where the first insulating layer 106 is disposed between the first silicon layer 104 and the second silicon layer 108. FIG. 7(b) shows the step of forming the horizontal cavity portions 112 in the first silicon layer 104. FIG. 7(c) shows the step of forming the vertical cavity portions 114 at each end of the horizontal cavity portion 112, where the vertical cavity portion 114 spans from the first insulating layer 106 through the first silicon layer 104. FIG. 7(d) shows the step of depositing a second insulating layer 126 on the walls of the vertical cavity portion 114 and on a top surface of the isolated silicon layer portion 116 of the first silicon layer 104, where the isolated silicon layer portion 116 is enveloped by the first insulating layer 106 and the second insulating layer 126. FIG. 7(e) shows the step of bonding a silicon substrate 202 to the second insulating layer 126 of the top surface of the first silicon layer 104, where a bottom region of the silicon substrate 202 is the conductive membrane layer 118. According to the current embodiment, because the first silicon layer 104 is an undoped silicon, the holes 206/302 are used to dope the isolated silicon layer portion 116, where the remainder of the first silicon layer 104 disposed on the ends of the cavity 110 remain undoped, as represented by the different area hatch marks in the first silicon layer 104. FIG. 7(f) shows the step of forming at least one ground contact hole 206 in the second silicon layer 108, and forming at least one active element contact hole 302 in the second silicon layer 108. FIG. 7(g) shows the step of forming at least one trench 128 in the second silicon layer 108 surrounding the ground contact element 105 and/or surrounding the active elements 101. FIG. 7(h) shows the step of removing the top region 204 of the silicon substrate 202 and a portion of the second insulating layer 126 on the isolate silicon layer portion of the ground element 105, where the membrane layer 118 spans at least across the active elements 101, and the isolated silicon layer portion 116 of the ground contact element 105 is exposed. FIG. 7(i) shows the steps of providing conductive material to the ground contact hole 206 to form the ground conductive via 132, providing conductive material to the active element contact hole 302 to form a conductive via 124. The steps shown in FIG. 7(i) further include depositing the bottom electrode layer 120 on the bottom of the second silicon layer 108, depositing the conductive top layer 134 to the exposed isolated silicon layer portion 116 of the ground contact element 105 that electrically conducts with the membrane layer 118, and depositing the top electrode 122 on the top of the membrane layer, wherein it is understood that the top electrode could be omitted when membrane layer 118 is electrically conductive and used as the top electrode layer, as discussed above. FIG. 7(j) shows step of bonding the separate electronic unit 136, where the bottom electrodes 120/130 and the ground electrode 130 are conductively connected 138 to the electronic unit 136.

Figure 8:
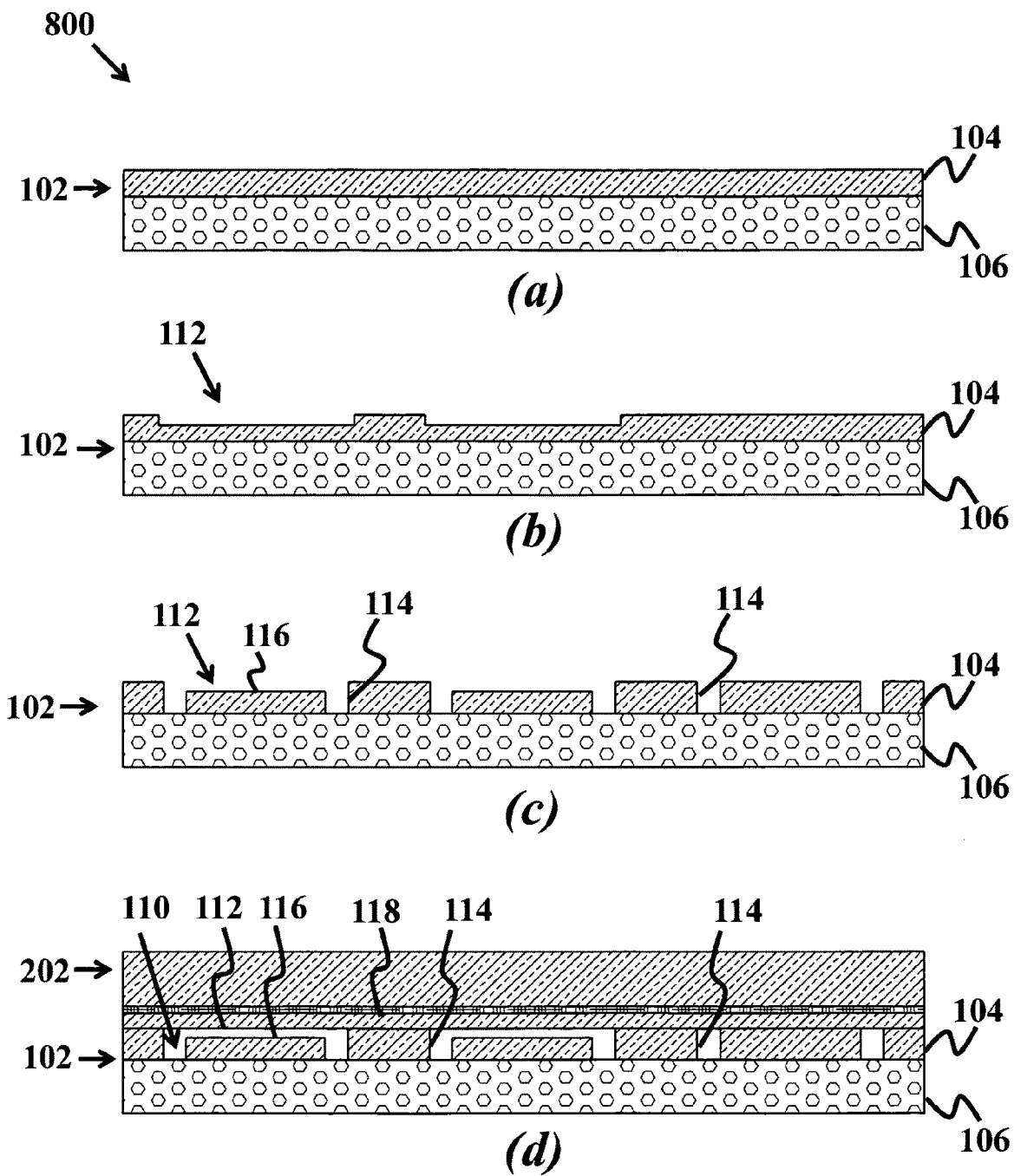
FIGS. 8(a)-8(h) show the steps of making different embodiments of the CMUT cell and an array structure according to the present invention.
Figure 8:
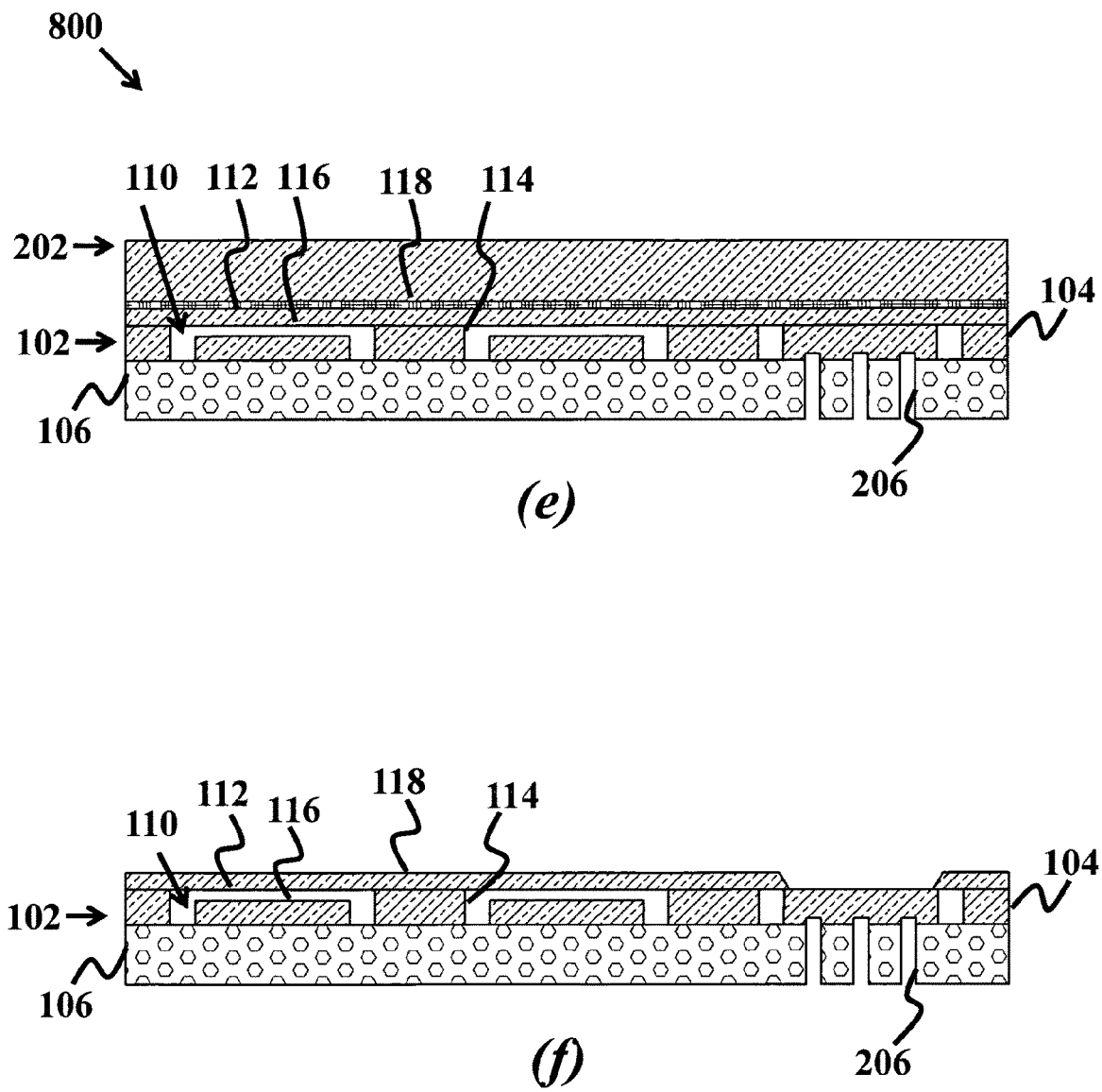
Figure 8:
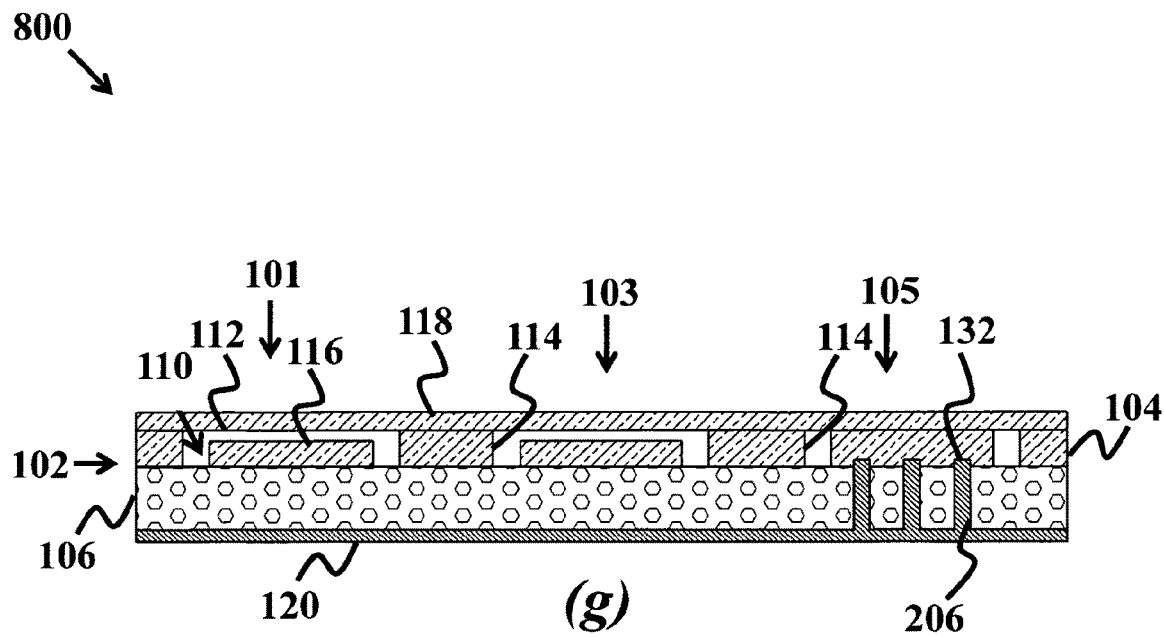
Figure 8:
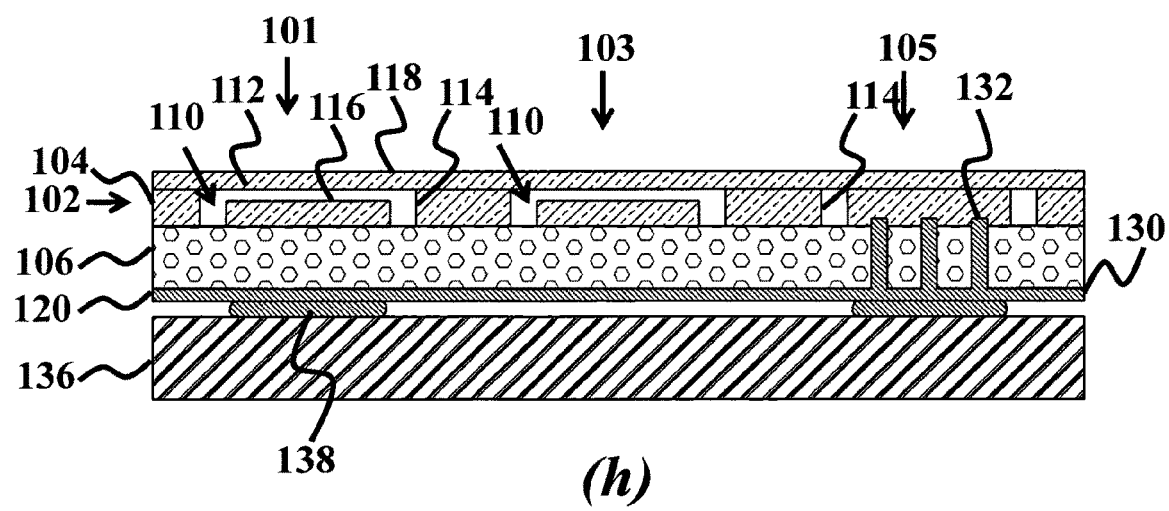

FIGS. 8(a)-8(i) show the steps for fabricating the CMUT cell and an array structure 100 described in FIG. 1(g) according to one embodiment of the invention. Beginning with FIG. 8(a) the steps include providing the first silicon on insulator (SOI) substrate 102 that has the doped first silicon layer 104 and the first insulating layer 106. FIG. 8(b) shows the step of forming the horizontal cavity portions 112 in the first silicon layer 104. FIG. 8(c) shows the step of forming the vertical cavity portions 114 at each end of the horizontal cavity portion 112, where the vertical cavity portion 114 spans from the first insulating layer 106 through the first silicon layer 104. FIG. 8(d) shows the step of bonding a silicon substrate 202 to the top surface of the first silicon layer 104, where a bottom region of the silicon substrate 202 is the membrane layer 118, and the top region 204 provides a means of manipulating the structure during fabrication. FIG. 8(e) shows the step of forming at least one ground contact hole 206 through the first silicon layer 104. FIG. 8(f) shows the step of removing the top region 204 of the silicon substrate 202, where the membrane layer 118 spans at least across the active elements 101, and the isolated silicon layer portion 116 of the ground contact element 105 is exposed. FIG. 8(g) shows the steps of providing conductive material to the ground contact hole 206 to form the ground conductive via 132, depositing the bottom electrode layer 120 on the bottom of the first insulating layer 10, depositing the conductive top layer 134 to the exposed isolated silicon layer portion 116 of the ground contact element 105 that electrically conducts with the membrane layer 118, and depositing the top electrode 122 on the top of the membrane layer, wherein it is understood that the top electrode could be omitted when membrane layer 118 is electrically conductive and used as the top electrode layer, as discussed above. FIG. 8(h) shows step of bonding the separate electronic unit 136, where the bottom electrodes 120/130 and the ground electrode 130 are conductively connected 138 to the electronic unit 136.

Figure 9:
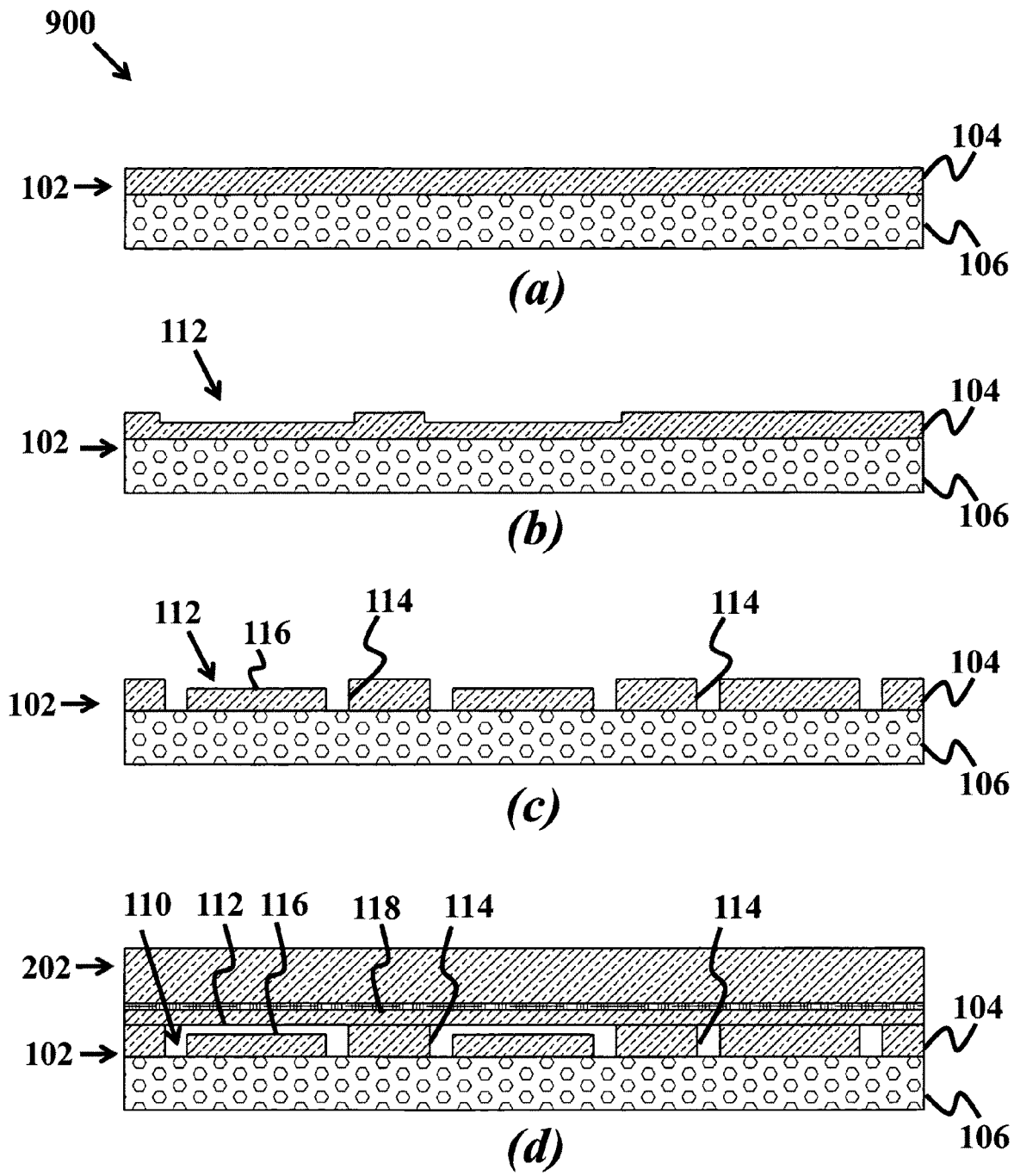
FIGS. 9(a)-9(h) show the steps of making different embodiments of the CMUT cell and an array structure according to the present invention.
Figure 9:
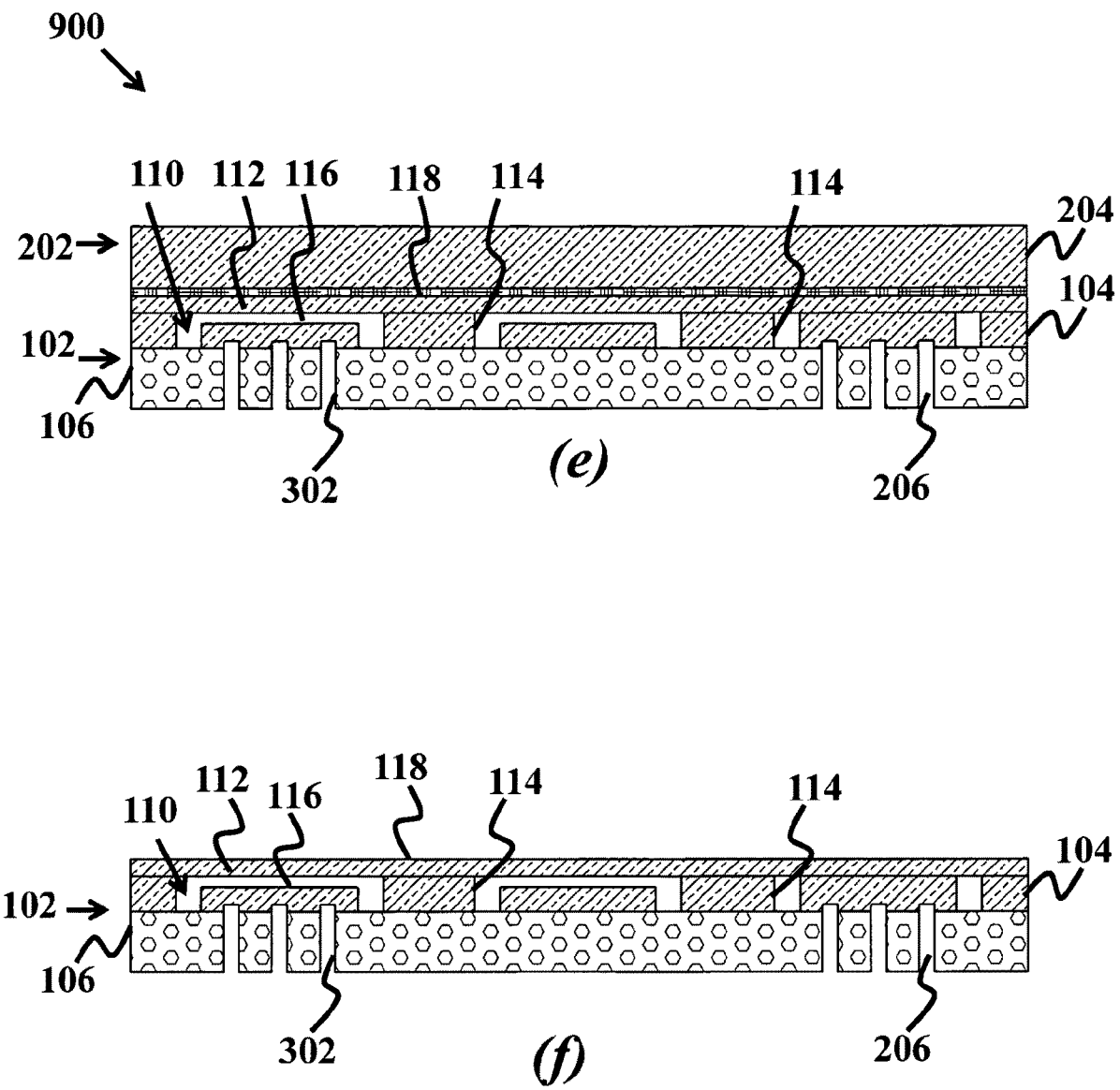
Figure 9:
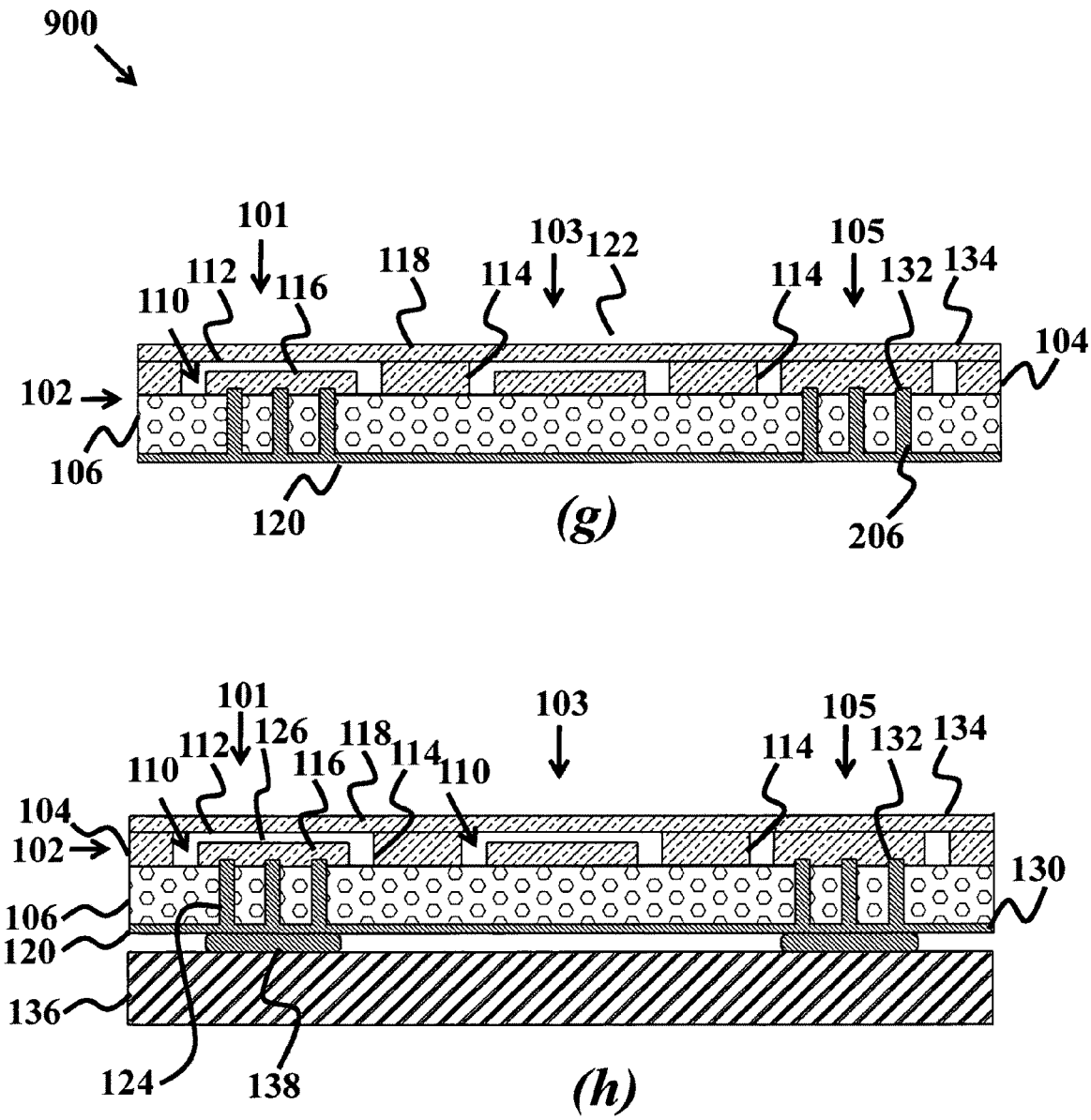

FIGS. 9(a)-9(i) show the steps for fabricating the CMUT cell and an array structure 100 described in FIG. 1(h) according to one embodiment of the invention. Beginning with FIG. 9(a) the steps include providing the first silicon on insulator (SOI) substrate 102 that has the doped first silicon layer 104 and the first insulating layer 106. FIG. 9(b) shows the step of forming the horizontal cavity portions 112 in the first silicon layer 104. FIG. 9(c) shows the step of forming the vertical cavity portions 114 at each end of the horizontal cavity portion 112, where the vertical cavity portion 114 spans from the first insulating layer 106 through the first silicon layer 104. FIG. 9(d) shows the step of bonding a silicon substrate 202 to the top surface of the first silicon layer 104, where a bottom region of the silicon substrate 202 is the membrane layer 118, and the top region 204 provides a means of manipulating the structure during fabrication. FIG. 9(e) shows the step of forming at least one ground contact hole 206 first insulating layer

106, and forming at least one active element contact hole 302 in the second silicon layer 108. FIG. 9(f) shows the step of forming at least one trench 128 in the second silicon layer 108 surrounding the ground contact element 105 and/or surrounding the active elements 101. FIG. 9(g) shows the step of removing the top region 204 of the silicon substrate 202, where the membrane layer 118 spans at least across the active elements 101, and the isolated silicon layer portion 116 of the ground contact element 105 is exposed. FIG. 9(h) shows the steps of providing conductive material to the ground contact hole 206 to form the ground conductive via 132, providing conductive material to the active element contact hole 302, depositing the bottom electrode layer 120 on the bottom of the second silicon layer 108, depositing the conductive top layer 134 to the exposed isolated silicon layer portion 116 of the ground contact element 105 that electrically conducts with the membrane layer 118, and depositing the top electrode 122 on the top of the membrane layer, wherein it is understood that the top electrode could be omitted when membrane layer 118 is electrically conductive and used as the top electrode layer, as discussed above. FIG. 9(i) shows step of bonding the separate electronic unit 136, where the bottom electrodes 120/130 and the ground electrode 130 are conductively connected 138 to the electronic unit 136.

Figure 10:
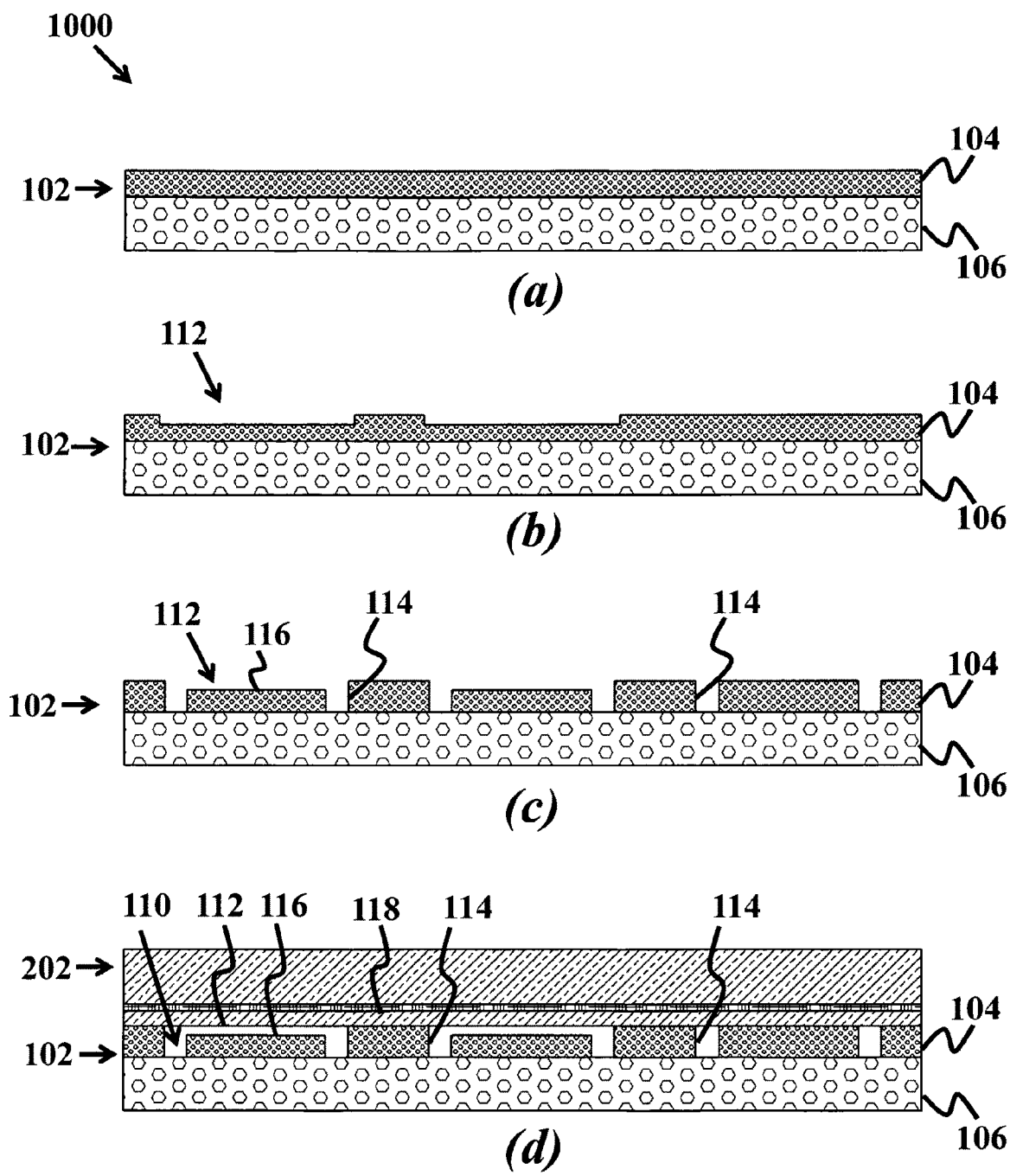
FIGS. 10(a)-10(h) show the steps of making different embodiments of the CMUT cell and an array structure according to the present invention.
Figure 10:
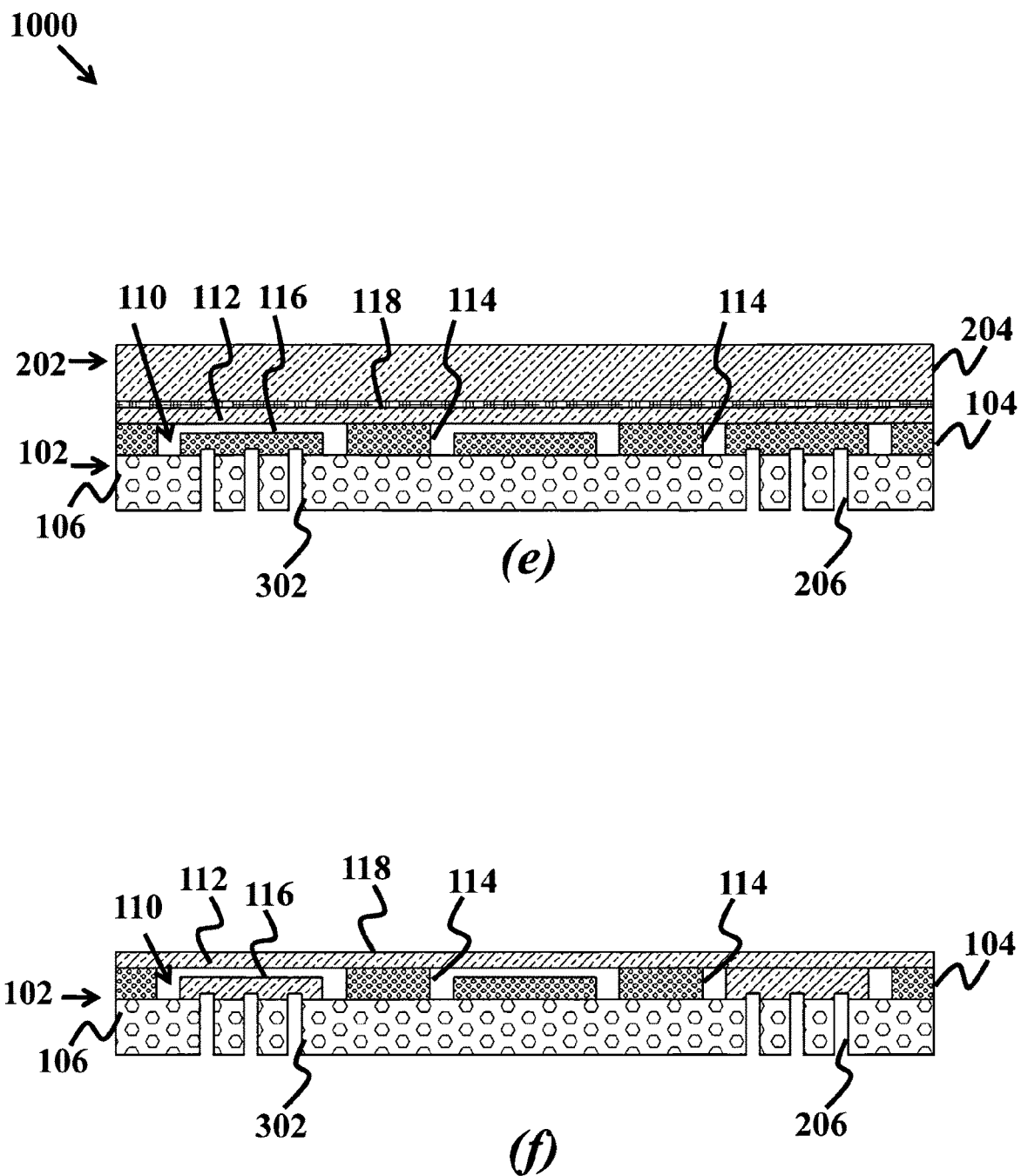
Figure 10:
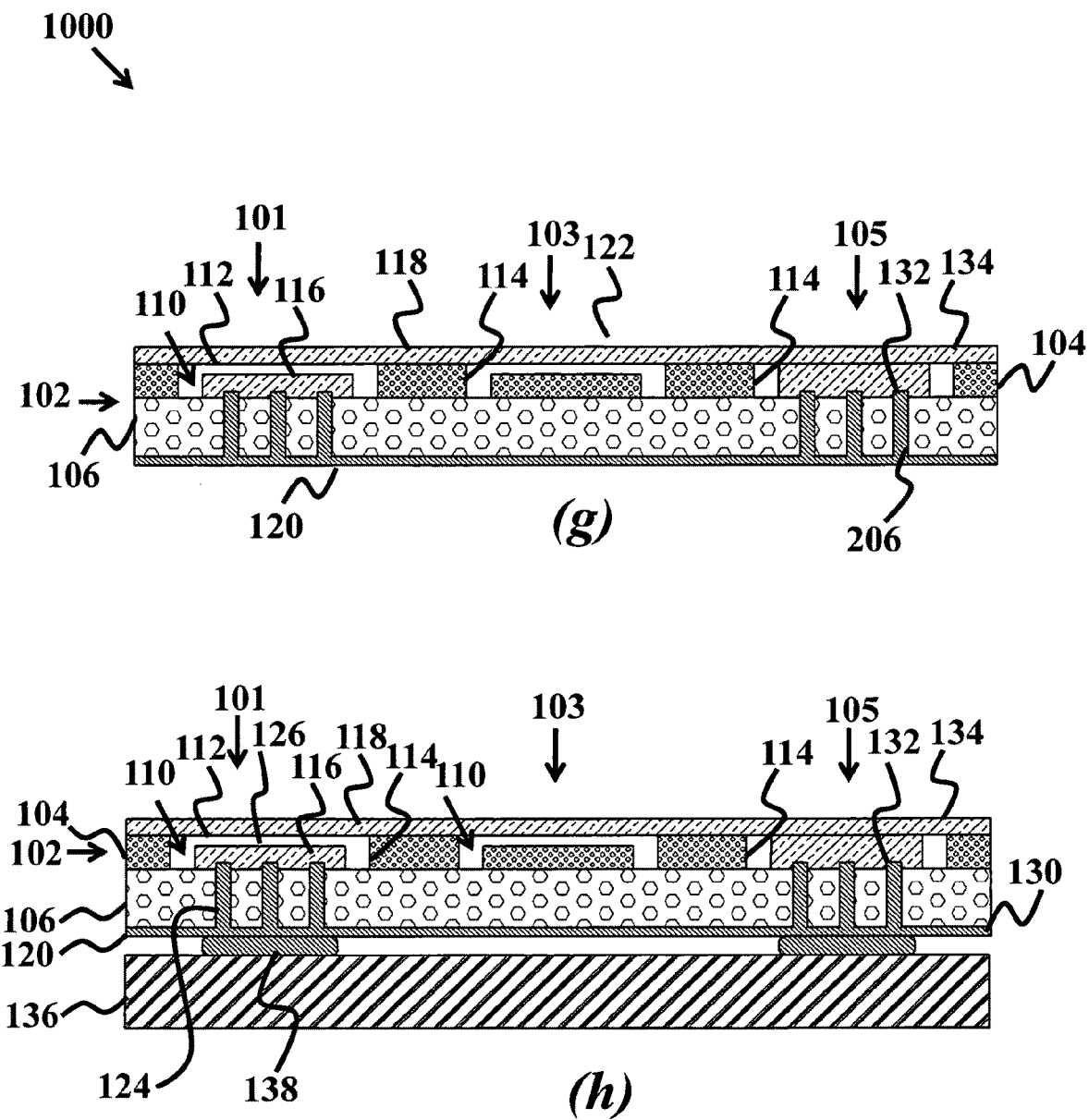

FIGS. 10(a)-10(i) show the steps for fabricating the CMUT cell and an array structure 100 described in FIG. 1(i) according to one embodiment of the invention. Beginning with FIG. 9(a) the steps include providing the first silicon on insulator (SOI) substrate 102 that has an undoped first silicon layer 104 and the first insulating layer 106. FIG. 10(b) shows the step of forming the horizontal cavity portions 112 in the first silicon layer 104. FIG. 10(c) shows the step of forming the vertical cavity portions 114 at each end of the horizontal cavity portion 112, where the vertical cavity portion 114 spans from the first insulating layer 106 through the first silicon layer 104. FIG. 10(d) shows the step of bonding a silicon substrate 202 to the top surface of the first silicon layer 104, where a bottom region of the silicon substrate 202 is the membrane layer 118, and the top region 204 provides a means of manipulating the structure during fabrication. FIG. 10(e) shows the step of forming at least one ground contact hole 206 first insulating layer 106, and forming at least one active element contact hole 302 in the second silicon layer 108. According to the current embodiment, because the first silicon layer 104 is an undoped silicon, the holes 206/302 are used to dope the isolated silicon layer portion 116, where the remainder of the first silicon layer 104 disposed on the ends of the cavity 110 remain undoped, as represented by the different area hatch marks in the first silicon layer 104. FIG. 10(f) shows the step of removing the top region 204 of the silicon substrate 202, where the membrane layer 118 spans at least across the active elements 101, and the isolated silicon layer portion 116 of the ground contact element 105 is exposed. FIG. 10(g) shows the steps of providing conductive material to the ground contact hole 206 to form the ground conductive via 132, providing conductive material to the active element contact hole 302 to form a conductive via 124. The steps shown in FIG. 10(g) further include depositing the bottom electrode layer 120 on the bottom of the second silicon layer 108, depositing the conductive top layer 134 to the exposed isolated silicon layer portion 116 of the ground contact element 105 that electrically conducts with the membrane layer 118, and depositing the top electrode 122 on the top of the membrane layer, wherein it is understood that the top electrode could be omitted when membrane layer 118 is electrically conductive and used as the top electrode layer, as discussed above. FIG. 10(h) shows step of bonding the separate electronic unit 136, where the bottom electrodes 120/130 and the ground electrode 130 are conductively connected 138 to the electronic unit 136.

Figure 11:
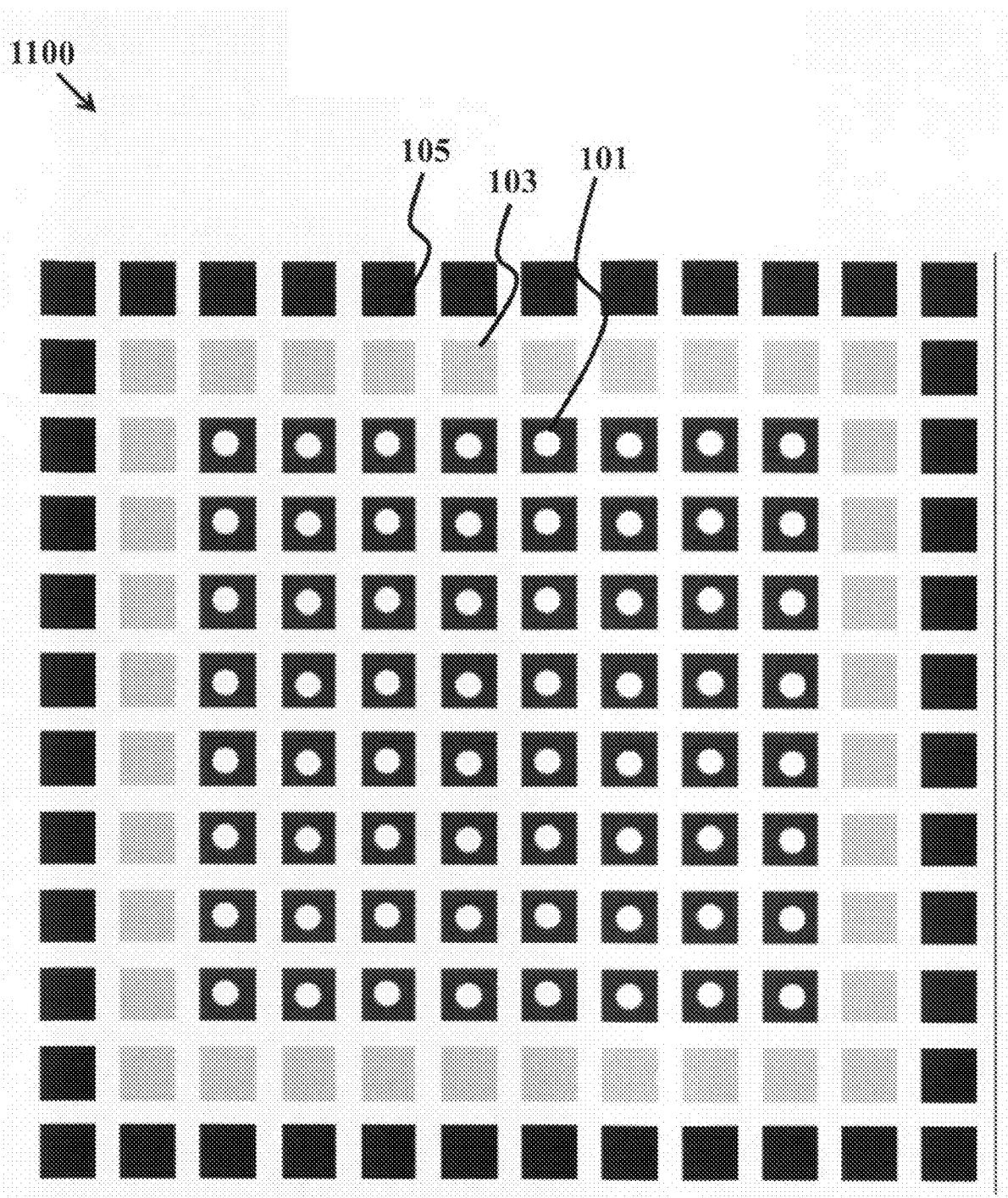
FIG. 11 shows a schematic diagram of CMUT cells with non-active and ground elements and an array structure according to the present invention.

FIG. 11 shows a schematic diagram 1100 of active CMUT elements 101, with non-active 103 and ground elements 105 and an array structure 100 according to the present invention, where each element has at least one CMUT cell. The non-active elements 103 have the purpose of providing the same boundary conditions to the active elements 101, which improves the uniform characteristics of all the active elements 101 and non-active elements 103, and provides more separation between the active electrodes 120 on the backside of the array 100 and the ground connecting elements 105.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art.

All such variations are considered to be within the scope and spirit of the present invention as defined by the following claims and their legal equivalents.

What is claimed:

1. A capacitive micromachined ultrasonic transducer (CMUT) array comprising:
    a. a silicon on insulator (SOI) substrate, wherein said SOI substrate comprises a doped first silicon layer and a first insulating layer;
    b. a doped second silicon layer, wherein said first insulating layer is disposed between said first silicon layer and said second silicon layer;
    c. at least two active elements, wherein each said active element is separated by an isolation trench, wherein said isolation trench is disposed through at least said SOI second silicon layer and surrounds said active element, wherein said first silicon layer provides mechanical support between said active elements;
    d. at least one cell disposed in said active element, wherein said cell comprises:
        i. a cavity in said first silicon layer, wherein a cross section of said cavity comprises a horizontal cavity portion on top of vertical cavity portions disposed at each end of said horizontal cavity portion, wherein said vertical cavity portion spans from said first insulating layer through said first silicon layer, wherein a portion of said first silicon layer is isolated by said first insulating layer and said cavity;
        ii. a membrane layer, wherein said membrane layer is disposed on said first silicon layer top surface, wherein said membrane layer spans across at least one said cavity; and
        iii. a bottom electrode, wherein said bottom electrode is disposed on a bottom surface of said second silicon layer;
    e. at least one ground contact element, wherein said ground contact element is isolated from said active elements by at least one said trench surrounding said ground contact element, wherein said ground contact element comprises:
        i. a ground electrode, wherein said ground electrode is disposed on a bottom surface of said doped second silicon layer;
        ii. at least one ground conductive via, wherein said ground conductive via is disposed from said ground electrode to said SOI first silicon layer; and
        iii. a conductive top layer, wherein said conductive top layer electrically conducts with said membrane layer, wherein said conductive top layer electrically conducts with said ground conductive via through said SOI first silicon layer, wherein said ground conductive via electrically conducts with said ground electrode, wherein said ground electrodes conduct with said membrane layer; and f. a separate electronic unit, wherein said bottom electrodes and said ground electrode are conductively connected to said electronic unit, wherein said ground contact elements are disposed at an end of said array.

2. The CMUT array of claim 1, wherein said separate electronic unit is selected from a group consisting of a printed circuit board, an integrated circuit, a wafer, a flexible printed circuit board, connection pins and bonding wires.

3. The CMUT array of claim 2, wherein said conductive connection to said integrated circuit comprises connecting to different channels of said integrated circuit.

4. The CMUT array of claim 1, wherein said conductive connection is selected from a group consisting of solder bump bonding, wafer bonding, soldering, integrated circuit die bonding, wire bonding, connection pins, spring force loaded connection pins, and conductive gluing techniques.

5. The CMUT array of claim 1, wherein a non-active element is disposed between said active element and said ground contact element, wherein said non-active element comprises at least an isolated said second SOI layer, wherein said isolated second SOI layer is isolated by said buried oxide layer and at least one said isolation trench.

6. The CMUT array of claim 1, wherein said active element bottom electrodes are DC biased.

7. The CMUT array of claim 1, wherein said first insulating layer is an oxide layer.

8. The CMUT array of claim 1, wherein said CMUT array further comprises a top electrode, wherein said top electrode is disposed on a top surface of said membrane layer, wherein said membrane layer is a nonconductive layer or a conductive layer selected from a group consisting of undoped silicon, silicon nitride, undoped silicon carbide, nonconductive diamond, doped silicon, doped silicon carbide, and conductive diamond.

9. The CMUT array of claim 1, wherein said membrane layer is made from a conductive material selected from a group consisting of doped silicon, doped silicon from a second said SOI substrate, silicon nitride, doped silicon carbide, doped polycrystalline silicon, undoped polycrystalline and conductive diamond, wherein said membrane layer is also an electrode.

10. The CMUT array of claim 1, wherein said CMUT array further comprises a second insulating layer, wherein said second insulating layer is disposed on a top surface of said first silicon layer, on the walls of said vertical cavity portion and on a top surface of said isolated silicon layer portion of said first silicon layer, wherein said isolated silicon layer portion is enveloped by said first insulating layer and said second insulating layer.

11. The CMUT array of claim 10, wherein said second insulating layer is an insulating oxide layer, wherein said insulating oxide layer has a thickness in a range from 10 nm to 30 μm.

12. The CMUT array of claim 1, wherein said cavity comprises a vacuum or a gas, wherein said gas is selected from a group consisting of air, noble gas, nitrogen, oxygen, hydrogen and carbon dioxide.

13. The CMUT array of claim 1, wherein said cell further comprises at least one conductive via, wherein said conductive via is disposed through said second silicon layer and into said isolated silicon layer, wherein said conductive via is in contact with said bottom electrode layer.

14. The CMUT array of claim 13, wherein said first silicon layer of said SOI substrate is undoped, wherein said isolated silicon layer is doped, wherein said via is a conduit for doping said isolated silicon layer.

15. The CMUT array of claim 13, wherein said conducting via has a hole diameter in a range of 1 μm to 100 μm.

16. The CMUT array of claim 1, wherein said first silicon layer has a thickness in a range from 1 μm to 1,000 μm.

17. The CMUT array of claim 1, wherein said second silicon layer has a thickness in a range from 1 μm to 1,000 μm.

18. The CMUT array of claim 1, wherein said membrane layer has a thickness in a range from 0.1 μm to 500 μm.

19. The CMUT array of claim 1, wherein said buried oxide layer has a thickness in a range from 0.01 μm to 60 μm.

20. The CMUT array of claim 1, wherein said horizontal cavity portion has a thickness in a range from 10 nm to 500 μm.

21. The CMUT array of claim 1, wherein said isolated silicon layer has a thickness in a range from 1 μm to 1,000 μm.

22. The CMUT array of claim 1, wherein said first insulating layer disposed on said top surface of said second silicon layer is thicker than a second insulating layer disposed on said vertical cavity portion and on said top surface of said isolated silicon layer portion.

23. The CMUT array of claim 22, wherein said second insulating layer disposed on said vertical cavity portion and said top surface of said isolated silicon layer portion has a thickness in a range of 1 nm to 10 μm.

24. The CMUT array of claim 1, wherein said trenches are filled with an electrically insulating material, wherein said insulating material is selected from a group consisting of, air, epoxy, low temperature oxide, silicon nitride, polymer, PDMS, parylene, spin on glass, polyimide, TEOS, rubber, PMMA, and gel.

25. A method of fabricating a capacitive micromachined ultrasonic transducer (CMUT) array comprising:
   a. providing a first silicon on insulator (SOI) substrate, wherein said first SOI substrate comprises a doped first silicon layer and a first insulating layer;
   b. providing a doped second silicon layer, wherein said first insulating layer is disposed between said first silicon layer and said second silicon layer;
   c. forming at least two active elements, wherein said active element is separated by an isolation trench surrounding said active element, wherein said trench is disposed through at least said SOI second silicon layer, wherein said first silicon layer provides mechanical support between said active elements;
   d. forming at least one cell in said active element comprising:
      i. forming at least one horizontal cavity portion in said first silicon layer;
      ii. forming a vertical cavity portion at each end of said at least one horizontal cavity portion, wherein said vertical cavity portion spans from said first insulating layer through said first silicon layer;
      iii. depositing a second insulating layer on said on a top surface of said first silicon layer, on the walls of said vertical cavity portion and on a top surface of said isolated silicon layer portion of said first silicon layer, wherein said isolated silicon layer portion is enveloped by said first insulating layer and said second insulating oxide layer;
      iv. bonding a silicon substrate to said second insulating layer of said top surface of said first silicon layer, wherein a bottom region of said silicon substrate is a conductive membrane layer; and v. removing a top region of said silicon substrate, wherein said silicon substrate bottom region forms said membrane layer across at least one said cavity;

e. forming at least one ground contact element, wherein said ground contact element is isolated from said active elements by at least one said trench surrounding said ground contact element, wherein said ground contact element comprises:

i. a ground electrode, wherein said ground electrode is disposed on a bottom surface of said doped second silicon layer;

ii. at least one ground conductive via, wherein said ground conductive via is disposed from said ground electrode to said SOI first silicon layer; and iii. a conductive top layer, wherein said conductive top layer electrically conducts with said membrane layer, wherein said conductive top layer electrically conducts with said ground conductive via through said SOI first silicon layer, wherein said ground conductive via electrically conducts with said ground electrode, wherein said ground electrodes conduct with said membrane layer; and f. providing a separate electronic unit, wherein said bottom electrodes and said ground electrodes are conductively connected to said electronic unit, wherein said ground contact elements are disposed at an end of said array.

26. The method of claim 25 further comprises depositing a top electrode on a top surface of said membrane layer, wherein said membrane layer is a nonconductive layer or a conductive layer selected from a group consisting of undoped silicon, silicon nitride, undoped silicon carbide, nonconductive diamond, doped silicon, doped silicon from a second said SOI substrate, silicon nitride, doped silicon carbide, and conductive diamond.

27. The method of claim 25, wherein said membrane layer is made from a conductive material selected from a group consisting of doped silicon, doped silicon from a second said SOI substrate, doped silicon carbide, and conductive diamond, wherein said membrane layer is also an electrode.

28. The method of claim 25, wherein before removing said top region of said silicon substrate, said method further comprises:

a. providing at least one contact hole disposed through said second silicon layer and into said isolated silicon layer; and b. depositing a conductive layer in said contact hole, wherein said conductive layer in said contact hole provides a conductive via to said isolated silicon layer from said bottom electrode layer.

29. The method of claim 25, wherein said first SOI substrate comprises an undoped first silicon layer, wherein said isolated silicon layer is undoped, wherein before removing said top region of said silicon substrate, said method further comprises:

a. providing at least one contact hole disposed through said second silicon layer and into said isolated silicon layer;

b. doping said undoped isolated silicon layer through said contact hole; and c. depositing a conductive layer in said contact hole, wherein said conductive layer in said contact hole provides a conductive via to said isolated silicon layer from said bottom electrode layer.

30. The method of claim 25, wherein said insulating layer disposed on said vertical cavity portion and said top surface of said isolated silicon layer portion has a thickness in a range of 1 nm to 10 µm.

31. The method of claim 25, wherein said bonding of said silicon substrate to said insulating layer is done in a vacuum or in a gas, wherein said cavity comprises said vacuum or said gas, wherein said gas is selected from a group consisting of air, noble gas, nitrogen, oxygen, hydrogen and carbon dioxide.

32. The method of claim 25, wherein said conductive bottom region of said silicon substrate is made from conductive material selected from a group consisting of doped silicon, doped silicon carbide, and conductive diamond.

33. The method of claim 25, wherein said separate electronic unit is selected from a group consisting of a printed circuit board, an integrated circuit, a wafer, a flexible printed circuit board, connection pins and bonding wires.

34. The method of claim 33, wherein said conductive connection to said integrated circuit comprises connecting to different channels of said integrated circuit.

35. The method of claim 25, wherein said conductive connection is selected from a group consisting of solder bump bonding, wafer bonding, soldering, integrated circuit die bonding, wire bonding, connection pins, spring force loaded connection pins, and conductive gluing techniques.

36. The method of claim 25, wherein a non-active element is disposed between said active element and said ground contact element, wherein said non-active element comprises at least an isolated said second SOI layer, wherein said isolated second SOI layer is isolated by said buried oxide layer and at least one said isolation trench.

37. The method of claim 25, wherein said active element bottom electrodes are DC biased.

38. The method of claim 25, wherein said trenches are filled with an electrically insulating material, wherein said insulating material is selected from a group consisting of, air, epoxy, low temperature oxide, silicon nitride, polymer, PDMS, parylene, spin on glass, polyimide, TEOS, rubber, PMMA, and gel.

39. A method of fabricating a capacitive micromachined ultrasonic transducer (CMUT) array comprising:

a. providing a first silicon on insulator (SOI) substrate, wherein said first SOI substrate comprises a doped first silicon layer and a first insulating layer;

b. providing a doped second silicon layer, wherein said first insulating layer is disposed between said first silicon layer and said second silicon layer;

c. forming at least two active elements, wherein said active element is separated by an isolation trench surrounding said active element, wherein said trench is disposed through at least said SOI second silicon layer, wherein said first silicon layer provides mechanical support between said active elements;

d. forming at least one cell in said active element comprising:

i. forming at least one horizontal cavity portion in said first silicon layer;

ii. forming a vertical cavity portion at each end of said at least one horizontal cavity portion, wherein said vertical cavity portion spans from said first insulating layer through said first silicon layer;

iii. depositing a second insulating layer on said on a top surface of said first silicon layer, on the walls of said vertical cavity portion and on a top surface of said isolated silicon layer portion of said first silicon layer, wherein said isolated silicon layer portion is enveloped by said first insulating layer and said second insulating oxide layer;
 iv. bonding a silicon substrate to said second insulating layer of said top surface of said first silicon layer, wherein a bottom region of said silicon substrate is a conductive membrane layer; and
 v. removing a top region of said silicon substrate, wherein said silicon substrate bottom region forms said membrane layer across at least one said cavity;
e. forming at least one ground contact element, wherein said ground contact element is isolated from said active elements by at least one said trench surrounding said ground contact element, wherein said ground contact element comprises:
 i. a ground electrode, wherein said ground electrode is disposed on a bottom surface of said doped second silicon layer;
 ii. at least one ground conductive via, wherein said ground conductive via is disposed from said ground electrode to said SOI first silicon layer; and
 iii. a conductive top layer, wherein said conductive top layer electrically conducts with said membrane layer, wherein said conductive top layer electrically conducts with said ground conductive via through said SOI first silicon layer, wherein said ground conductive via electrically conducts with said ground electrode, wherein said ground electrodes conduct with said membrane layer; and
f. providing a separate electronic unit, wherein said bottom electrodes and said ground electrodes are conductively connected to said electronic unit, wherein said ground contact elements are disposed at an end of said array.

40. The method of claim 39 further comprises depositing a top electrode on a top surface of said membrane layer, wherein said membrane layer is a nonconductive layer or a conductive layer selected from a group consisting of undoped silicon, silicon nitride, undoped silicon carbide, nonconductive diamond, doped silicon, doped silicon from a second said SOI substrate, silicon nitride, doped silicon carbide, and conductive diamond.

41. The method of claim 39, wherein said membrane layer is made from a conductive material selected from a group consisting of doped silicon, doped silicon from a second said SOI substrate, doped silicon carbide, and conductive diamond, wherein said membrane layer is also an electrode.

42. The method of claim 39, wherein before removing said top region of said silicon substrate, said method further comprises:
 a. providing at least one contact hole disposed through said second silicon layer and into said isolated silicon layer; and
 b. depositing a conductive layer in said contact hole, wherein said conductive layer in said contact hole provides a conductive via to said isolated silicon layer from said bottom electrode layer.

43. The method of claim 39, wherein said first SOI substrate comprises an undoped first silicon layer, wherein said isolated silicon layer is undoped, wherein before removing said silicon substrate top layer, said method further comprises:
 a. providing at least one contact hole disposed through said second silicon layer and into said isolated silicon layer;
 b. doping said undoped isolated silicon layer through said contact hole; and
 c. depositing a conductive layer in said contact hole, wherein said conductive layer in said contact hole provides a conductive via to said isolated silicon layer from said bottom electrode layer.

44. The method of claim 39, wherein said bonding of said silicon substrate to said top surface of said first silicon layer is done in a vacuum or in a gas wherein said cavity comprises said vacuum or said gas, wherein said gas is selected from a group consisting of air, noble gas, nitrogen, oxygen, hydrogen, and helium.

45. The method of claim 39, wherein said separate electronic unit is selected from a group consisting of a printed circuit board, an integrated circuit, a wafer, a flexible printed circuit board, connection pins and bonding wires.

46. The method of claim 45, wherein said conductive connection to said integrated circuit comprises connecting to different channels of said integrated circuit.

47. The method of claim 39, wherein said conductive connection is selected from a group consisting of solder bump bonding, wafer bonding, soldering, integrated circuit die bonding, wire bonding, connection pins, spring force loaded connection pins, and conductive gluing techniques.

48. The method of claim 39, wherein a non-active element is disposed between said active element and said ground contact element, wherein said non-active element comprises at least an isolated said second SOI layer, wherein said isolated second SOI layer is isolated by said buried oxide layer and at least one said isolation trench.

49. The method of claim 39, wherein said active element bottom electrodes are DC biased.

50. The method of claim 39, wherein said trenches are filled with an electrically insulating material, wherein said insulating material is selected from a group consisting of, air, epoxy, low temperature oxide, silicon nitride, polymer, PDMS, parylene, spin on glass, polyimide, TEOS, rubber, PMMA, and gel.

51. A capacitive micromachined ultrasonic transducer (CMUT) array comprising:
a. a doped first silicon layer;
b. a first insulating layer, wherein said doped first silicon layer is disposed on said first insulating layer;
c. at least two active elements;
d. at least one cell disposed in said active element, wherein said cell comprises:
 i. a cavity in said first silicon layer, wherein a cross section of said cavity comprises a horizontal cavity portion on top of vertical cavity portions disposed at each end of said horizontal cavity portion, wherein said vertical cavity portion spans from said first insulating layer through said first silicon layer, wherein a portion of said first silicon layer is isolated by said first insulating layer and said cavity;
 ii. a membrane layer, wherein said membrane layer is disposed on said first silicon layer top surface, wherein said membrane layer spans across at least one said cavity; and
 iii. a bottom electrode, wherein said bottom electrode is disposed on a bottom surface of said second silicon layer;
e. at least one ground contact element, wherein said ground contact element is isolated from said active elements by a trench disposed through at least said SOI second silicon layer, wherein said ground contact element comprises:
 i. a ground electrode, wherein said ground electrode is disposed on a bottom surface of said doped second silicon layer;

ii. at least one ground conductive via, wherein said ground conductive via is disposed from said ground electrode to said SOI first silicon layer; and iii. a conductive top layer, wherein said conductive top layer electrically conducts with said membrane layer, wherein said conductive top layer electrically conducts with said ground conductive via through said SOI first silicon layer, wherein said ground conductive via electrically conducts with said ground electrode, wherein said ground electrodes conduct with said membrane layer; and f. a separate electronic unit, wherein said bottom electrodes and said ground electrode is conductively connected to said electronic unit, wherein said ground contact elements are disposed at an end of said array.

52. The CMUT array of claim 51 further comprises at least one isolation trench, wherein each said active element is separated by said isolation trench, wherein said isolation trench is disposed through at least said first insulating layer and surrounds said active element, wherein said first silicon layer provides mechanical support between said active elements.

53. The CMUT array of claim 51, wherein said trenches are filled with an electrically insulating material, wherein said insulating material is selected from a group consisting of, air, epoxy, low temperature oxide, silicon nitride, polymer, PDMS, parylene, spin on glass, polyimide, TEOS, rubber, PMMA, and gel.

54. The CMUT array of claim 51, wherein said first insulating layer is selected from a group consisting of oxide, quartz, glass, pyrex, soda lime, borosilicate, borofloat glass, fused quartz, fused silica, and sapphire.

55. The CMUT array of claim 51, wherein said CMUT array further comprises a top electrode, wherein said top electrode is disposed on a top surface of said membrane layer, wherein said membrane layer is a nonconductive layer or a conductive layer selected from a group consisting of undoped silicon, silicon nitride, undoped silicon carbide, nonconductive diamond, doped silicon, doped silicon carbide, and conductive diamond.

56. The CMUT array of claim 51, wherein said membrane layer is made from a conductive material selected from a group consisting of doped silicon, doped silicon from a second said SOI substrate, silicon nitride, doped silicon carbide, doped polycrystalline silicon, undoped polycrystalline and conductive diamond, wherein said membrane layer is also an electrode.

57. The CMUT array of claim 51, wherein said CMUT array further comprises a second insulating layer, wherein said second insulating layer is disposed on a top surface of said first silicon layer, on the walls of said vertical cavity portion and on a top surface of said isolated silicon layer portion of said first silicon layer, wherein said isolated silicon layer portion is enveloped by said first insulating layer and said second insulating layer.

58. The CMUT array of claim 57, wherein said second insulating layer is an insulating oxide layer, wherein said insulating oxide layer.

59. The CMUT array of claim 57, wherein said second insulating layer has a thickness in a range of 1 nm to 30 μm.

60. The CMUT array of claim 51, wherein said cavity comprises a vacuum or a gas, wherein said gas is selected from a group consisting of air, noble gas, nitrogen, oxygen, hydrogen and carbon dioxide.

61. The CMUT array of claim 51, wherein said CMUT array further comprises at least one conductive via, wherein said conductive via is disposed through said first insulating layer and into said isolated silicon layer, wherein said conductive via is in contact with said bottom electrode layer.

62. The CMUT array of claim 61, wherein said conducting via has a hole diameter in a range of 1 μm to 100 μm.

63. The CMUT array of claim 51, wherein said first insulating layer has a thickness in a range from 1 μm to 1,000 μm.

64. The CMUT array of claim 51, wherein said first silicon layer has a thickness in a range from 1 μm to 1,000 μm.

65. The CMUT array of claim 51, wherein said horizontal cavity portion has a thickness in a range from 10 nm to 500 μm.

66. The CMUT array of claim 51, wherein said isolated silicon layer has a thickness in a range from 1 μm to 1,000 μm.

67. The CMUT array of claim 51, wherein said separate electronic unit is selected from a group consisting of a printed circuit board, an integrated circuit, a wafer, a flexible printed circuit board, connection pins and bonding wires.

68. The CMUT array of claim 67, wherein said conductive connection to said integrated circuit comprises connecting to different channels of said integrated circuit.

69. The CMUT array of claim 51, wherein said conductive connection is selected from a group consisting of solder bump bonding, wafer bonding, soldering, integrated circuit die bonding, wire bonding, connection pins, spring force loaded connection pins, and conductive gluing techniques.

70. The CMUT array of claim 51, wherein said active element bottom electrodes are DC biased.

* * * * *